(12) United States Patent
Cable

(10) Patent No.: US 12,253,719 B2
(45) Date of Patent: Mar. 18, 2025

(54) MACH ZEHNDER LATTICE BASED GENERALIZED MACH ZEHNDER INTERFEROMETER

(71) Applicant: Psiquantum, Corp., Palo Alto, CA (US)

(72) Inventor: Hugo Cable, San Mateo, CA (US)

(73) Assignee: Psiquantum, Corp., Palo Alto, CA (US)

( * ) Notice: Subject to any disclaimer, the term of this patent is extended or adjusted under 35 U.S.C. 154(b) by 183 days.

(21) Appl. No.: 17/858,852

(22) Filed: Jul. 6, 2022

(65) Prior Publication Data

US 2023/0021995 A1 Jan. 26, 2023

Related U.S. Application Data

(60) Provisional application No. 63/218,651, filed on Jul. 6, 2021.

(51) Int. Cl.
*G02B 6/293* (2006.01)
*G02F 1/21* (2006.01)
*G02F 1/225* (2006.01)

(52) U.S. Cl.
CPC ......... *G02B 6/29355* (2013.01); *G02F 1/212* (2021.01); *G02F 1/225* (2013.01)

(58) Field of Classification Search
CPC .............................................. G02B 6/29355
See application file for complete search history.

(56) References Cited

U.S. PATENT DOCUMENTS

| 5,572,611 | A | * | 11/1996 | Jinguji | G02B 6/136 385/17 |
| 6,222,955 | B1 | * | 4/2001 | Lagali | G02F 1/3136 385/20 |
| 6,538,787 | B1 | * | 3/2003 | Moeller | G02B 6/29395 385/11 |

(Continued)

OTHER PUBLICATIONS

K. Okamoto et al. Fabrication of TE / TM mode splitter using completely buried GaAs / GaAlAs waveguide. Japanese Journal of Applied Physics, vol. 34 No. 1R, pp. 151-155, Jan. 1995 (https://doi.org/10.1143/JJAP.34.151) (Year: 1995).*

(Continued)

*Primary Examiner* — Michael Stahl
(74) *Attorney, Agent, or Firm* — Kilpatrick Townsend & Stockton LLP

(57) ABSTRACT

An optical phase shift circuit can include: a first Mach Zehnder lattice and a second Mach Zehnder lattice. Each Mach Zehnder lattice can have a first waveguide and a second waveguide, with a set of active phase shifters disposed along one of the waveguides and a plurality of directional coupler regions disposed along both waveguides between the active phase shifters. A first passive phase shifter can be coupled between one output path of the first Mach Zehnder lattice and one input path of the second Mach Zehnder lattice, and a second passive phase shifter can be coupled between the other output path of the first Mach Zehnder lattice and the other input path of the second Mach Zehnder lattice. Optical phase shift circuits of this kind can be used to implement phase shifters in a Generalized Mach Zehnder interferometer.

17 Claims, 16 Drawing Sheets

(56) References Cited

U.S. PATENT DOCUMENTS

| | | | |
|---|---|---|---|
| 7,590,312 B2* | 9/2009 | Mizuno | G02F 1/3136 |
| | | | 385/20 |
| 10,534,130 B1 | 1/2020 | Ravi et al. | |
| 2004/0136647 A1* | 7/2004 | Mizuno | G02B 6/12019 |
| | | | 385/24 |
| 2004/0160665 A1* | 8/2004 | Nakamoto | H04B 10/25073 |
| | | | 359/337.2 |
| 2005/0169630 A1* | 8/2005 | Takiguchi | G02B 6/29395 |
| | | | 398/53 |
| 2008/0044184 A1* | 2/2008 | Popovic | H04J 14/0206 |
| | | | 398/82 |
| 2009/0220228 A1* | 9/2009 | Popovic | G02B 6/29343 |
| | | | 398/48 |
| 2017/0276878 A1* | 9/2017 | Hu | G02B 6/29352 |
| 2019/0196100 A1 | 6/2019 | Nickerson et al. | |
| 2021/0027188 A1 | 1/2021 | Nickerson et al. | |
| 2021/0325924 A1 | 10/2021 | Cable | |
| 2023/0010363 A1* | 1/2023 | Cable | G02F 1/225 |

OTHER PUBLICATIONS

T. Kambayashi et al. Analysis of a novel intersection waveguide-type optical polarization splitter using birefringence of GaInAsP/InP superlattice. Electronics and Communications in Japan, Part 2, vol. 79 No. 4, pp. 20-29, 1996 (https://doi.org/10.1002/ecjb.4420790403) (Year: 1996).*

* cited by examiner

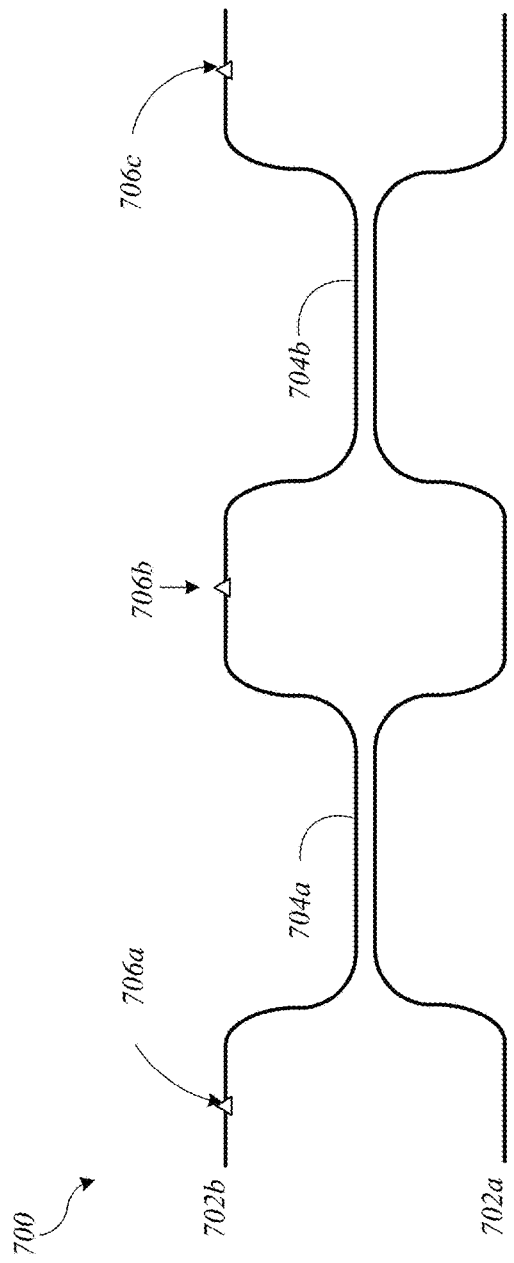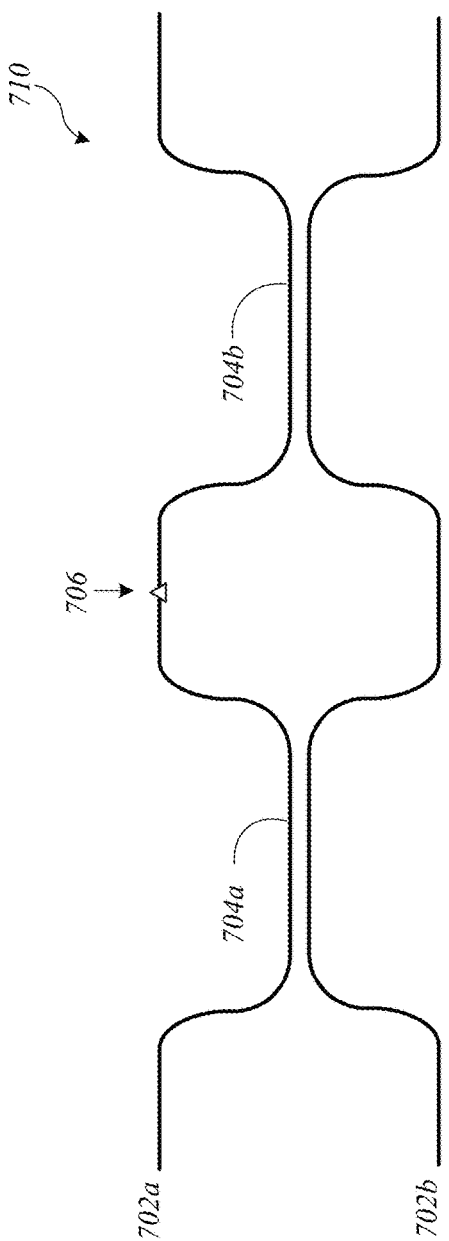
FIG. 7A
FIG. 7B

Circuit notation

─●─ 2-mode beamsplitter/directional coupler
─●─ (transfer matrix is 2x2 Hadamard matrix)

$$\begin{aligned}W &= \\ &= (S_{N/n_1,n_1} I^{(N/n_1)} \otimes W^{(n_1)} S^t_{N/n_1,n_1})(W^{(n_1)} \otimes I^{(N/n_1)})(I^{(n_1)} \otimes W^{(n_2)} \otimes I^{(N/(n_1 n_2))}) \cdots (I^{(N/n_r)} \otimes W^{(n_r)}) \\ &\quad (I^{(n_1)} \otimes S_{N/(n_1 n_2), n_2} I^{(N/n_2)} \otimes W^{(n_2)} I^{(n_1)} \otimes S^t_{N/(n_1 n_2), n_2}) \cdots \\ &\quad (I^{(N/n_r)} \otimes W^{(n_r)})\end{aligned}$$

*FIG. 16*

MACH ZEHNDER LATTICE BASED GENERALIZED MACH ZEHNDER INTERFEROMETER

CROSS-REFERENCE TO RELATED APPLICATION

This application claims the benefit of U.S. Provisional Application No. 63/218,651, filed Jul. 6, 2021, the disclosure of which is incorporated herein by reference.

BACKGROUND

This disclosure relates generally to linear optics and in particular to a multiplexer (MUX) implemented using a Mach Zehnder lattice-based Generalized Mach Zehnder Interferometer (GMZI).

Photonic switches operate to selectably direct photons from one of a set of input paths to one of a set of output paths. In some switches, paths can be selected by operating active optical components to provide the desire optical coupling and/or to suppress undesired optical couplings. Photonic switches have a variety of applications, including any type of linear optical circuits.

SUMMARY

Certain embodiments of the present invention relate to optical phase shift circuits implemented using Mach Zehnder lattices. In some embodiments, a phase shift circuit can include: a first Mach Zehnder lattice having a first waveguide defining a first input path and first output path, a second waveguide defining a second input path and a second output path, the first Mach Zehnder lattice including a plurality of first active phase shifters disposed along the first waveguide and a plurality of directional coupler regions disposed along both waveguides between the first active phase shifters; a second Mach Zehnder lattice having a first waveguide defining a first input path and first output path, a second waveguide defining a second input path and a second output path, the second Mach Zehnder lattice including a plurality of second active phase shifters disposed along the second waveguide and a plurality of directional coupler regions disposed along both waveguides between the second active phase shifters; a first passive phase shifter coupled between the first output path of the first Mach Zehnder lattice and the first input path of the second Mach Zehnder lattice, the first passive phase shifter implementing a first phase shift; and a second passive phase shifter coupled between the second output path of the first Mach Zehnder lattice and the second input path of the second Mach Zehnder lattice, the second passive phase shifter implementing a second phase shift different from the first phase shift. For instance, the first phase shift and the second phase shift can differ by $\pi$ radians. In some embodiments, the plurality of first active phase shifters can include a number (S) of active phase shifters and the plurality of second active phase shifters can also include the number S of active phase shifters. In some embodiments, the first Mach Zehnder lattice can also include a plurality of first dummy phase shifters disposed along the second waveguide at locations corresponding to the first active phase shifters, the second Mach Zehnder lattice can also include a plurality of second dummy phase shifters disposed along the first waveguide at locations corresponding to the second active phase shifters. In some embodiments, the first waveguide of the first Mach Zehnder lattice can have an input port coupled to vacuum; the second waveguide of the first Mach Zehnder lattice can have an input port coupled to an upstream optical component capable of providing photons; the first waveguide of the second Mach Zehnder lattice can have an output port coupled to a downstream optical component capable of receiving photons; and the second waveguide of the second Mach Zehnder lattice can have an output port coupled to vacuum.

According to certain embodiments, phase shift circuits implemented using Mach Zehnder lattices can be used to implement phase shifts in a Generalized Mach Zehnder interferometer (GMZI). In some embodiments, a circuit can include: a first Hadamard-type passive interferometer having a plurality of input paths and a plurality of output paths; a second Hadamard-type passive interferometer having a plurality of input paths and a plurality of output paths; and a plurality of phase shifter circuits, each phase shifter circuit coupled between one of the output paths of the first Hadamard-type passive interferometer and one of the input paths of the second Hadamard-type passive interferometer. Each phase shifter circuit can include: a first Mach Zehnder lattice having a first waveguide defining a first input path and first output path, a second waveguide defining a second input path and a second output path, the first Mach Zehnder lattice including a plurality of first active phase shifters disposed along the first waveguide and a plurality of directional coupler regions disposed along both waveguides between the first active phase shifters; a second Mach Zehnder lattice having a first waveguide defining a first input path and first output path, a second waveguide defining a second input path and a second output path, the second Mach Zehnder lattice including a plurality of second active phase shifters disposed along the second waveguides and a plurality of directional coupler regions disposed along both waveguides between the second active phase shifters; a first passive phase shifter coupled between the first output path of the first Mach Zehnder lattice and the first input path of the second Mach Zehnder lattice, the first passive phase shifter implementing a first phase shift; and a second passive phase shifter coupled between the second output path of the first Mach Zehnder lattice and the second input path of the second Mach Zehnder lattice, the second passive phase shifter implementing a second phase shift different from the first phase shift. In some embodiments, the first waveguide of the first Mach Zehnder lattice has an input port coupled to vacuum; the second waveguide of the first Mach Zehnder lattice has an input port coupled to an output port of one of the first Hadamard-type passive interferometers; the first waveguide of the second Mach Zehnder lattice has an output port coupled to an input port of one of the second Hadamard-type passive interferometers; and the second waveguide of the second Mach Zehnder lattice has an output port coupled to vacuum.

The following detailed description, together with the accompanying drawings, will provide a better understanding of the nature and advantages of the claimed invention.

BRIEF DESCRIPTION OF THE DRAWINGS

FIGS. 7A and 7B show, in schematic form, examples of physical implementations of a Mach-Zehnder Interferometer (MZI) configuration that can be used in some embodiments.

FIG. 16 shows an equation for a type of specific decomposition of GMZI networks that can be used in some embodiments.

DETAILED DESCRIPTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

GMZIs and MZIs can be used as the building blocks for many photonic switching networks. Certain embodiments described herein relate to a GMZI that uses Mach-Zehnder lattice (MZL) subcomponents to suppress the effect of phase-shifter loss in all switch configurations. (MZLs are interferometric devices which can be used for optical switching with digital-like behavior, see e.g. J. Van Campenhout, et al. Optics Express 17, 23793 (2009); J. Van Campenhout, et al. Optics Express 19, 11568 (2011)). Examples of GMZIs and optical circuits incorporating GMZIs are described below with reference to FIGS. 11A-18B.

Certain embodiments described herein provide a "Hadamard-type" GMZI. This type of GMZI is an N-mode device which can enact N switching configurations (where N is any power of two). Each of these configurations performs a permutation operation on the light at the input ports, and it is possible to route light from any one input port to any chosen target output port. The configurations are selected using one layer of active phase shifter devices which are set to values 0 or $\pi$. Thus, a Hadamard-type GMZI can be used as an N×N optical switch.

For purposes of the present description, the phase-shifter loss model is taken to be transmittance $T(\varphi)=T(\pi)^{|\varphi|/\pi}$ where $\varphi$ is a controllable phase shift between 0 and $2\pi$. This loss model is relevant to phase-shifter devices based on carrier depletion and injection, as well as devices which suffer from unwanted polarization rotation. The phase shifter error model is assumed to be Gaussian-distributed random phase error with standard deviation scaling $\propto \varphi$.

Some embodiments can suppress loss and phase error, with additional interferometric stages achieving lower loss and more "digital: behavior for the N×N switch. Switches of this kind can be used in a variety of applications in classical and quantum photonics which depend on high-speed optical switching where it is important to minimize switch losses.

1. Phase Shifters Using Mach Zehnder Lattice

Figure 1A:
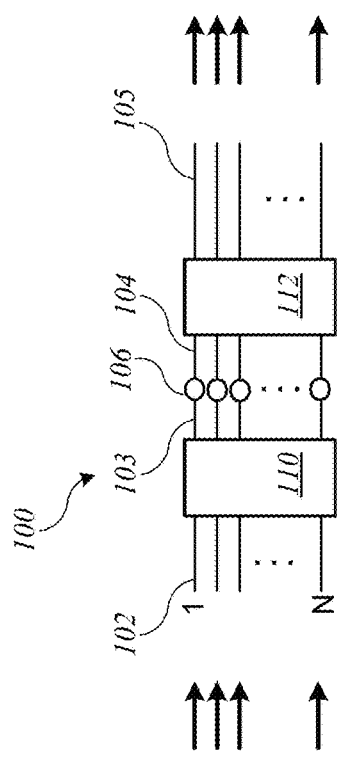
FIG. 1A shows a simplified circuit diagram of a Hadamard-type Generalized Mach Zehnder interferometer (GMZI) according to some embodiments.

FIG. 1A shows a simplified circuit diagram of a Hadamard-type GMZI 100 according to some embodiments. GMZI 100 has a set of N input ports 102 and a set of N output ports 104, where N=$2^a$ for integer a. (In other words, N is a power of 2.) Input ports 102 are coupled to inputs of a first Hadamard-type passive interferometer 110, and output ports 105 are coupled to outputs of a second Hadamard-type passive interferometer 112. (Example implementations of Hadamard-type passive interferometers are described below.) Each output port 103 of first Hadamard-type interferometer 110 is coupled to a corresponding input port 104 of Hadamard-type passive interferometer 112 by a phase shifter 106. A control logic circuit (not shown), which can be a classical digital logic circuit, can generate control signals for phase shifters 106. By selecting an appropriate set of control signals for phase shifters 106, GMZI 100 can be operated to output, at output ports 10a desired permutation of a group of photons received on input ports 102 at output ports 105.

Figure 1B:
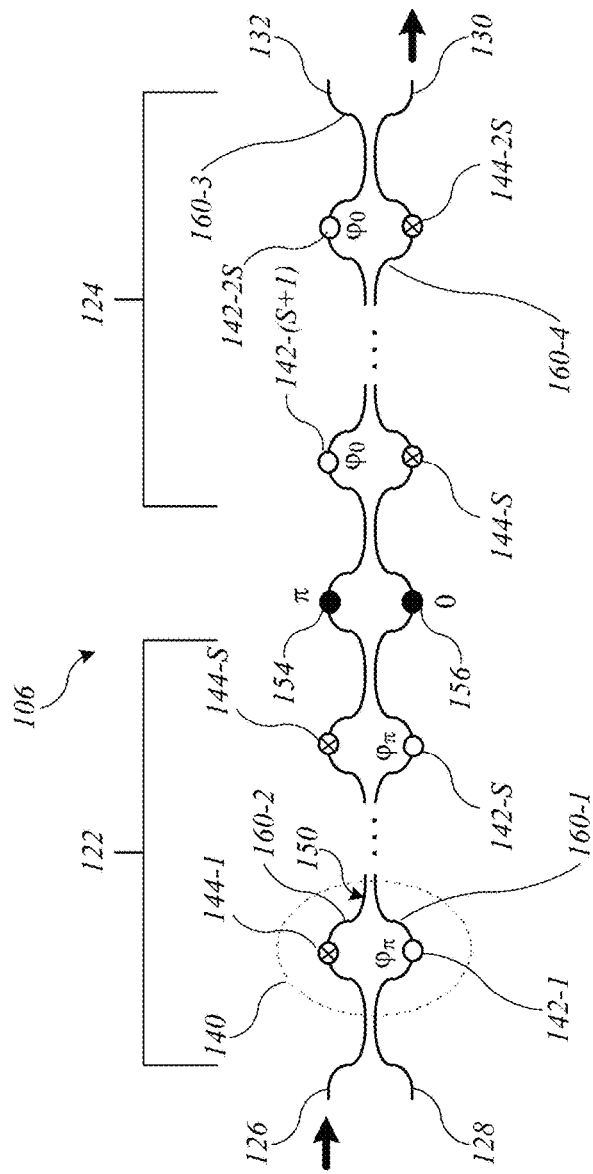
FIG. 1B shows a simplified circuit diagram of a Mach Zehnder lattice (MZL) based phase shifter circuit according to some embodiments.

According to some embodiments, each phase shifter 106 can be implemented using a coupled pair of Mach Zehnder lattices (MZL). FIG. 1B shows a simplified circuit diagram of an MZL-based phase shifter circuit 106 according to some embodiments. Phase shifter 106 includes two input ports 126 and 128 and two output ports 130 and 132. Input port 126 can be coupled to an output port of Hadamard-type GMZI 110 of FIG. 1A, and output port 130 can be coupled to an input port of Hadamard-type GMZI 112 of FIG. 1A. Input ports 128 and output ports 132 can be coupled to vacuum. (As used herein, a "port" can be a section of waveguide to which other waveguides can be coupled.)

Phase shifter circuit 106 can include a first (1×2) MZL 122 and a second (2×1) MZL 124, each of which includes a pair of waveguides defining first and second optical paths. MZL 122 includes waveguides 160-1 and 160-2, and MZL 124 includes waveguides 160-3 and 160-4. Each of MZL 122, 124 can have a number (S) of stages 140. Each stage 140 can include an active phase shifter 142 disposed along one of the waveguides 160-*i*. Active phase shifters 142 can be implemented using a variety of techniques, including electro-optic materials for which the refractive index changes as a function of an applied electric field. (Additional examples of phase shifter implementations are described below.)

Each active phase shifter 142 can apply a selectable phase shift in a range from 0 to $\pi$ (in radians). Each stage 140 can also include a dummy phase shifter 144 on the other optical path. Dummy phase shifter 144 can apply a constant (e.g., zero) phase shift. Beam splitter regions (also referred to as "directional coupler regions") 150 can be included on the optical paths between the pairs of phase shifters 142, 144, coupling successive stages together. Each directional coupler 150 can have a transmittance ($T_i$, also referred to as "transmissivity," and the transmittance for different directional couplers can be equal or different. For instance, transmittance can be tapered such that it is higher for directional couplers 150 at one end of MZL 122 and lower at the other end of MZL 122. Such tapering can be in either direction (increasing transmissivity at successively-encountered directional couplers or decreasing transmissivity at successively-encountered directional couplers). In some embodiments, directional coupler regions 150 can be formed by arranging lengths of waveguides 160-3 and 160-4 (or waveguides 160-1 and 160-2) in proximity to each other to provide a desired transmittance; examples are described below.

MZL 122 and MZL 124 are coupled together by a pair of phase shifters 154, 156. Phase shifter 154 couples waveguide 160-2 to waveguide 160-3, and phase shifter 156 couples waveguide 160-1 to 160-4. Phase shifters 154, 156 can apply fixed phase shifts, which can be different from each other. For example phase shifter 154 can apply a phase shift of $\pi$ while phase shifter 156 applies a phase shift of 0; more generally the phase shifts applied by phase shifters 154, 156 can differ by $\pi$ radians. As shown, the coupling can be such that waveguide 160-1 in MZL 122, which passes through active phase shifters 142-1 through 142-S is coupled to waveguide 160-4 in MZL 124, which passes through dummy phase shifters 144-(S+1) through 144-2S. Conversely, waveguide 160-2 in MZL 122, which passes through dummy phase shifters 144-1 through 144-S is coupled to waveguide 160-3 in MZL 124, which passes through active phase shifters 142-(S+1) through 142-2S. In this arrangement, a photon entering port 126 (or port 128) that reflects at each directional coupler would pass through S active phase shifters 142 and S dummy phase shifters 144 before exiting port 132 (or port 134).

For operation as a phase shifter, one input port 126 (or 128) of phase shifter circuit 106 can be coupled to receive a photon from an upstream component or device (e.g., from one of the output ports of Hadamard-type passive interferometer 110 shown in FIG. 1A) while the other input port 128 (or 126) is coupled to vacuum Similarly, one output port 130 (or 132) of phase shifter circuit 106 can be coupled to a downstream component or device (e.g., to one of the input ports of Hadamard-type passive interferometer 112 shown above). Coupling to vacuum can be achieved, e.g., by terminating a waveguide at a dead end; the termination can include photon absorbing materials to avoid contamination with unwanted light. Each active phase shifter 142-1 through 142-S in MZL 122 can be set to apply a phase shift of p while each active phase shifter 142-1 through 142-S in MZL 122 can be set to apply a phase shift $\varphi_\pi$. In some embodiments, $\varphi_\pi$ and $\varphi_0$ are chosen such that $|\varphi_\pi - \varphi_0| = \pi$. In this configuration, MZL 122 can act as a 1×2 switch while MZL 124 acts as a 2×1 switch. For a photon entering at port 126, one of phase shifters 154, 156 can be selected (by controlling the phase shift $\varphi_\pi$ of active phase shifters 142-1 through 142-S), thereby achieving a phase swing of $\pi$ radians, and active phase shifters 142-(S+1) through 142-2S can be used to propagate the photon from the selected one of phase shifters 154, 156 to output port 130 (by controlling the phase shift $\varphi_0$ of active phase shifters 142-(S+1) through 142-2S).

Phase shifter circuit 106 can achieve low loss phase shifting of a photon. For instance, when all the phase shifters 142 are off, the light crosses from one mode into the other due to the combined transmittance of the directional couplers; however when the phase shifters in one arm are set to a suitable value $\varphi$ the light is confined to the opposite arm. (In general $\varphi$ can take a range of values which varies according to the precise design.) Because the loss of the phase shifters is assumed to increase with p, the output loss is suppressed, and increasing the number S of MZL stages can strengthen the effect. In some embodiments, tapering the transmittance values for the directional couplers can also enable some additional optimization.

Figure 2:
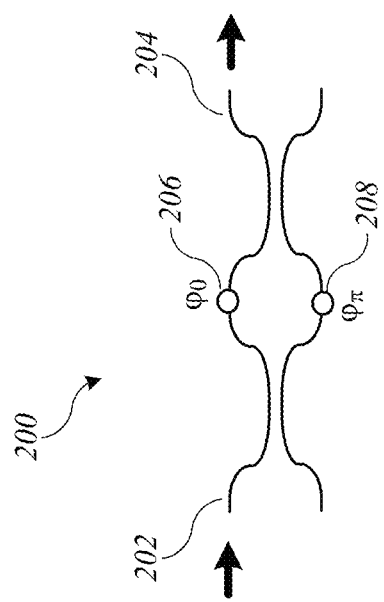
FIG. 2 shows a phase shifter circuit using a single Mach Zehnder interferometer.

FIG. 2 shows a modified MZI circuit 200 that provides a point of comparison for the performance of phase shifter circuit 106 of FIG. 1B. MZI circuit 200 is configured to provide a phase shift between a fixed input port 202 and a fixed output port 204. In some GMZI implementations, MZI circuit 200 can be used instead of a single phase-shifter in order to remove setting-dependence for loss and phase error. Setting phase shifters 206, 208 to ($\varphi$, 0) or (0, $\varphi$) achieves a phase swing of $\pi$ (for any value of $\varphi$). The transmittance is $\sin^2(\varphi/2)$, and setting $\varphi$ to $\pi$ maximizes extinction ratio.

Figures 3A, 3B:
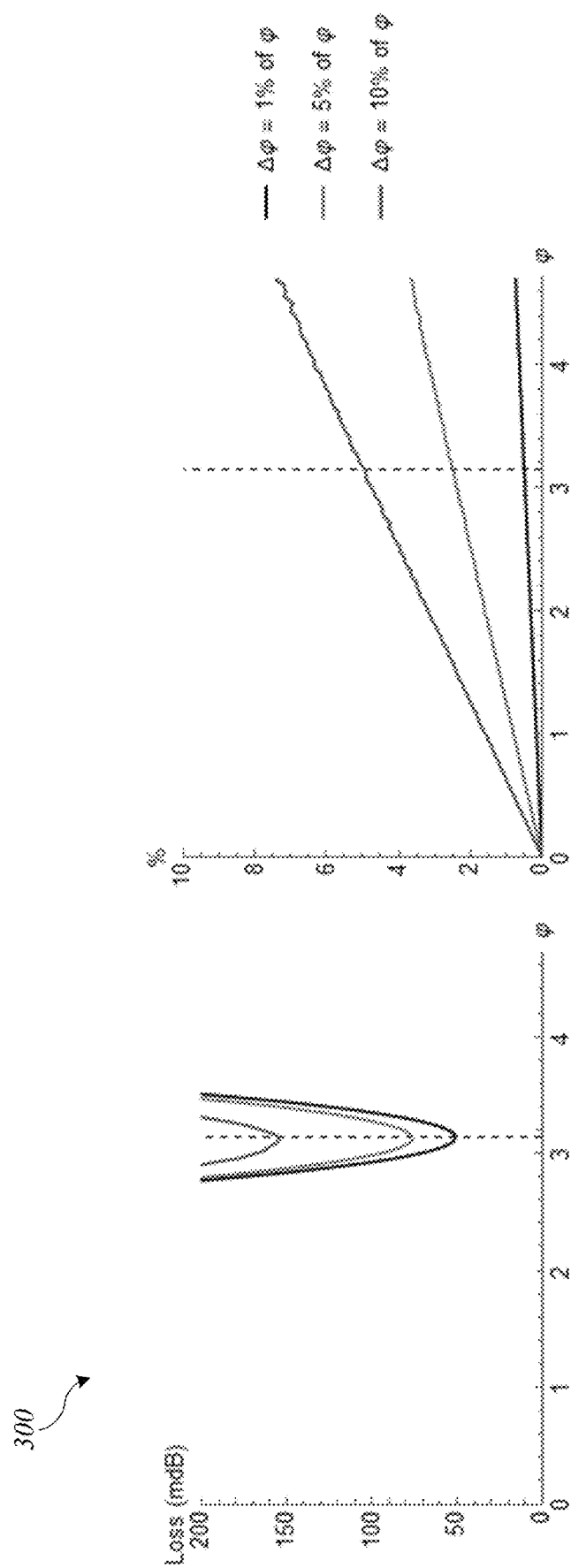
FIGS. 3A and 3B show graphs illustrating the performance of the circuit of FIG. 2.

FIGS. 3A and 3B show graphs 310, 320 illustrating performance of modified MZI circuit 200 of FIG. 2 as determined from modeling of circuit behavior. Graph 310 shows output loss as a function of $\varphi$, and graph 320 shows phase variability as a function of $\varphi$ for different percentage values of phase variation ($\Delta\varphi$). It is assumed that phase-shifter loss $L_\pi = 100$ mdB. As shown in FIG. 3A, the settings-averaged output loss is $\sim L_\pi/2$ when the phase variability is small (i.e., around 1% of $\pi$), but increases significantly with increasing phase-shifter variability. The output phase variability can be shown to be half the value for the component phase shifter which is switched on.

Figure 4:
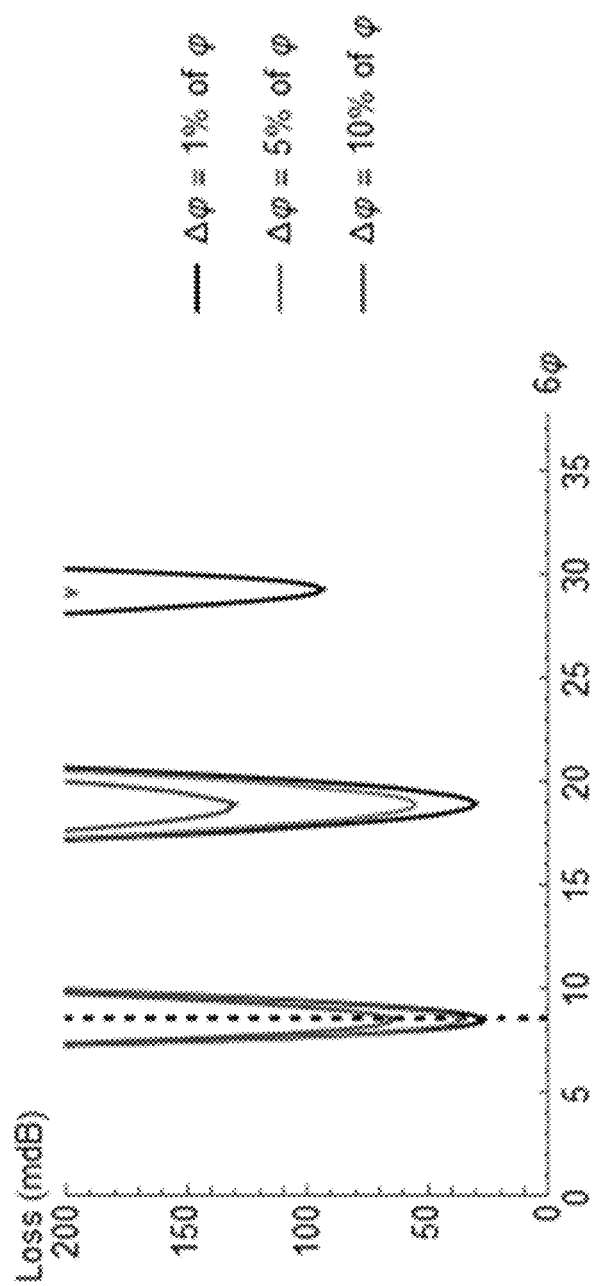
FIG. 4 shows a graph illustrating the performance of an MZL-based phase shifter circuit according to some embodiments.

FIG. 4 shows a graph 400 illustrating performance of phase shifter circuit 106 of FIG. 1B according to some embodiments, as determined from modeling of circuit behavior. In this example, each MZL 122, 124 has S=3 stages, which corresponds to six interferometric stages across MZLs 122 and 124. Graph 400 shows output loss as a function of 6$\varphi$. As shown, output losses in this example are 27 mdB, 36 mdB, and 65 mdB for 1%, 5% and 10% phase-shifter imprecision respectively. These values are approximately halved compared to modified MZI circuit 200 (which achieves 51 mdB, 77 mdB, and 157 mdB respectively).

Figure 5:
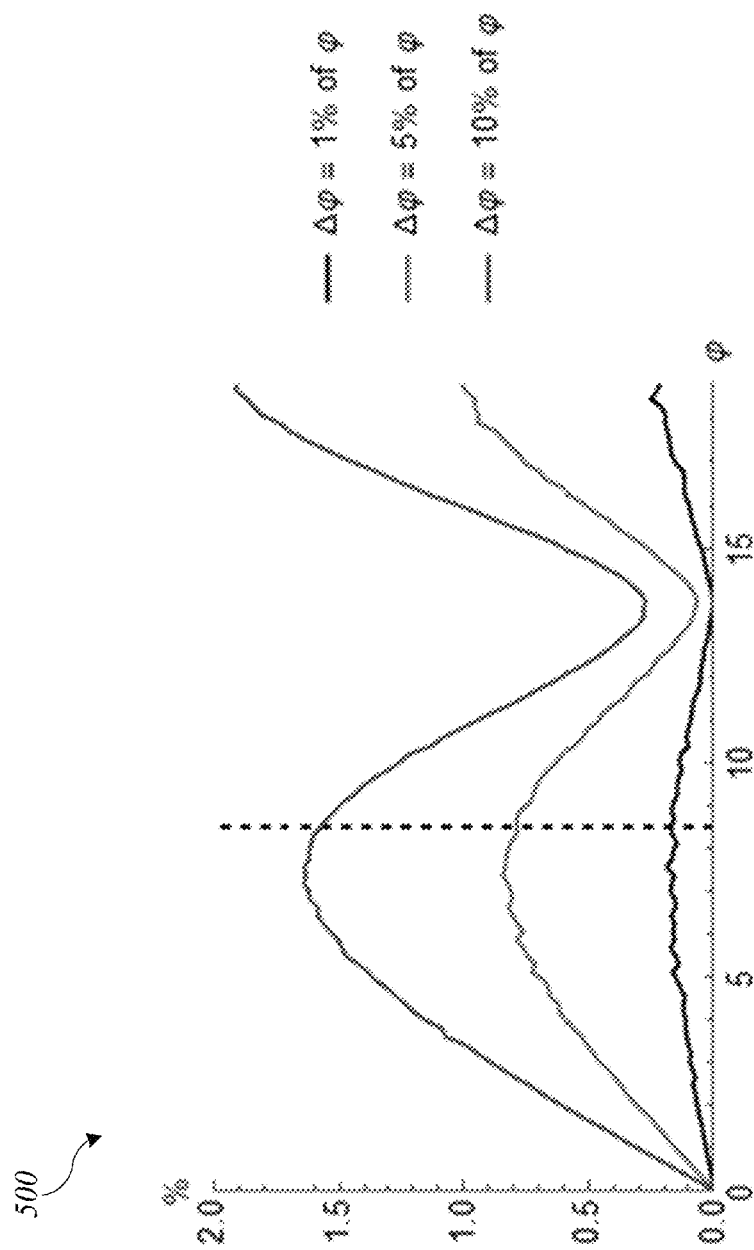
FIG. 5 shows a graph of output phase error as a function of phase shift for an MZL-based phase shifter according to some embodiments.

In addition, the spread, or variability, of the output phase shift of phase shifter 106 in this example is improved by about a factor of 3 (for all three curves) compared to modified MZI circuit 200. FIG. 5 shows a graph 500 of output phase error (100×Δ(output phase)/π) as a function of 6φ according to some embodiments.

For a large GMZI, the output loss due to reduced extinction ratio arising specifically from the active phase-shifters can be approximately $-10 \log_{10} [1-(pc\times\pi)^2]$ where pc is is the percentage error on the phase. Hence, the factor of 3 improvement in phase-shifter variability translates into a factor of 10 improvement in loss associated with the extinction ratio. For instance, in some embodiments a 10% error for the component phase shifters can give a 110 mdB additional loss for the output of the GMZI using the MZI scheme but only a 12 mdB loss using an MZL-based scheme of the kind shown in FIG. 1.

It is noted that phase shifter 106 has an increased total length of phase shifters across all interferometric stages as compared to modified MZI circuit 200. For one implementation of phase shifter 106 with S=3, the total length of phase shifters is almost 3π. The increased total length may introduce additional phase-shifter loss that scales with the total length.

2. Mach Zehnder Interferometer Implementations

The foregoing description makes references to Mach Zehnder interferometers (MZI). In some embodiments, an MZI can be used to couple photons propagating in the same time bin in different waveguides. This section provides additional examples of MZI behavior and implementations, in part to illustrate techniques that can be used to construct GMZIs and/or phase shifters such as phase shifter 106. For purposes of the present description, a photon (or absence thereof) in a waveguide in a given time bin is referred to as a "mode"; an "occupied" mode has a photon, while an "unoccupied" or "vacuum" mode does not. In some embodiments, mode occupancy can be used to encode information, including quantum information (e.g., qubits or qudits); however, the present disclosure is not limited to any particular use-case.

Figure 6A:
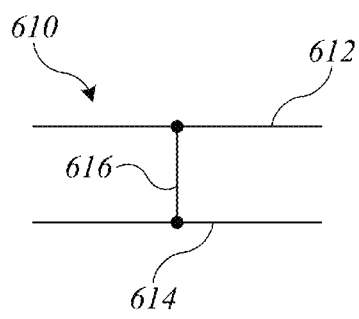
FIG. 6A shows a schematic diagram for coupling of two modes.

FIG. 6A shows a schematic diagram 610 (also referred to as a circuit diagram or circuit notation) for coupling of two modes. The modes are drawn as horizontal lines 612, 614, and the mode coupler 616 is indicated by a vertical line that is terminated with nodes (solid dots) to identify the modes being coupled. In the more specific language of linear quantum optics, the mode coupler 616 shown in FIG. 6A represents a 50/50 beam splitter that implements a transfer matrix:

$$T = \frac{1}{\sqrt{2}} \begin{pmatrix} 1 & i \\ i & 1 \end{pmatrix}, \quad (1)$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 612), and the second column corresponds to creation operators on the second mode (referred to herein as mode 6, labeled as horizontal line 614), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}} \begin{pmatrix} 1 & -i \\ -i & 1 \end{pmatrix} \begin{pmatrix} a_1^\dagger \\ a_2^\dagger \end{pmatrix}_{output}, \quad (2)$$

where subscripts on the creation operators indicate the mode that is operated on, the subscripts input and output identify the form of the creation operators before and after the beam splitter, respectively and where:

$$a_i|n_i,n_j\rangle = \sqrt{n_i}|n_i-1,n_j\rangle$$

$$a_j|n_i,n_j\rangle = \sqrt{n_j}|n_i,n_j-1\rangle$$

$$a_j^\dagger|n_i,n_j\rangle = \sqrt{n_j+1}|n_i,n_j+1\rangle \quad (3)$$

For example, the application of the mode coupler shown in FIG. 6A leads to the following mappings:

$$a_{1_{input}}^\dagger \mapsto \frac{1}{\sqrt{2}}\left(a_{1_{output}}^\dagger - ia_{2_{output}}^\dagger\right) \quad (4)$$

$$a_{2_{input}}^\dagger \mapsto \frac{1}{\sqrt{2}}\left(-ia_{1_{output}}^\dagger + a_{2_{output}}^\dagger\right)$$

Thus, the action of the mode coupler described by Eq. (1) is to take the input states |10⟩, |01⟩, and |11⟩ to $$|10\rangle \mapsto \frac{|10\rangle - i|01\rangle}{\sqrt{2}} \quad (5)$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 6B:
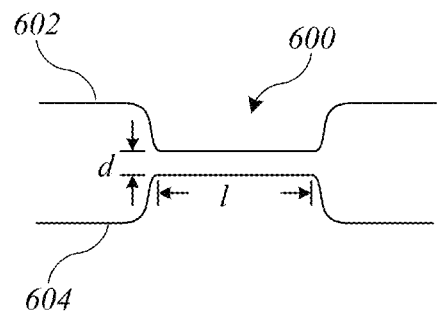
FIG. 6B shows, in schematic form, a physical implementation of mode coupling in a photonic system that can be used in some embodiments.

FIG. 6B shows a physical implementation of a mode coupling that implements the transfer matrix T of Eq. (1) for two photonic modes in accordance with some embodiments. In this example, the mode coupling is implemented using a waveguide beam splitter 600, also sometimes referred to as a directional coupler or mode coupler. Waveguide beam splitter 600 can be realized by bringing two waveguides 602, 604 into close enough proximity that the evanescent field of one waveguide can couple into the other. By adjusting the separation d between waveguides 602, 604 and/or the length l of the coupling region, different couplings between modes can be obtained. In this manner, a waveguide beam splitter 600 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \quad (6)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi 3$ materials such as lithium niobite, BBO, KTP, and the like and even doped semiconductors such as silicon, germanium, and the like.

Beam-splitters with variable transmissivity and arbitrary phase relationships between output modes can also be achieved by combining directional couplers and variable phase-shifters in a Mach-Zehnder Interferometer (MZI) configuration 700, e.g., as shown in FIG. 7A. Complete control over the relative phase and amplitude of the two modes 702a, 702b in dual rail encoding can be achieved by varying the phases imparted by phase shifters 706a, 706b, and 706c and the length and proximity of coupling regions 704a and 704b. FIG. 7B shows a slightly simpler example of a MZI 710 that allows for a variable transmissivity between modes 702a, 702b by varying the phase imparted by the phase shifter 706. FIGS. 7A and 7B are examples of how one could implement a mode coupler in a physical device, but any type of mode coupler/beam splitter can be used without departing from the scope of the present disclosure.

Figure 8A:
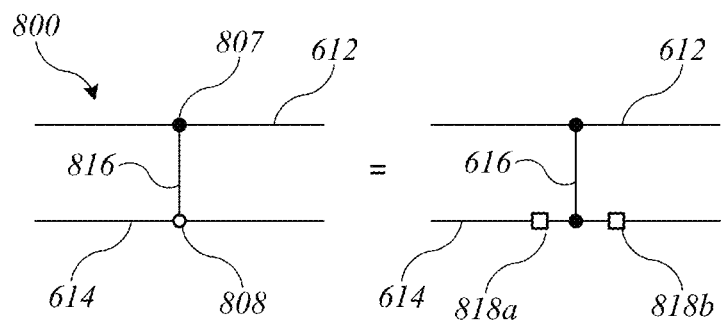
FIG. 8A shows another schematic diagram for coupling of two modes.

In some embodiments, beam splitters and phase shifters can be employed in combination to implement a variety of transfer matrices. For example, FIG. 8A shows, in a schematic form similar to that of FIG. 6A, a mode coupler 800 implementing the following transfer matrix:

$$T_r = \frac{1}{\sqrt{2}} \begin{pmatrix} 1 & 1 \\ 1 & -1 \end{pmatrix}. \quad (7)$$

Thus, mode coupler 800 applies the following mappings:

$$|10\rangle \mapsto \frac{|10\rangle + |01\rangle}{\sqrt{2}} \quad (8)$$

$$|01\rangle \mapsto \frac{|10\rangle - |01\rangle}{\sqrt{2}}$$

$$|11\rangle \mapsto \frac{1}{2}(|20\rangle + |02\rangle).$$

Figure 8B:
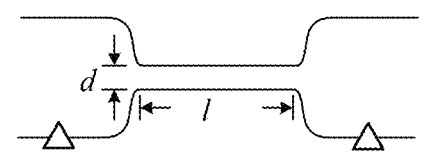
FIG. 8B shows, in schematic form, a physical implementation of the mode coupling of FIG. 4A in a photonic system that can be used in some embodiments.

The transfer matrix $T_r$ of Eq. (7) is related to the transfer matrix T of Eq. (1) by a phase shift on the second mode. This is schematically illustrated in FIG. 8A by the closed node 807 where mode coupler 816 couples to the first mode (line 612) and open node 808 where mode coupler 816 couples to the second mode (line 614). More specifically, $T_r$=sTs, and, as shown at the right-hand side of FIG. 8A, mode coupler 816 can be implemented using mode coupler 616 (as described above), with a preceding and following phase shift (denoted by open squares 818a, 818b). Thus, the transfer matrix $T_r$ can be implemented by the physical beam splitter shown in FIG. 8B, where the open triangles represent +i phase shifters.

Figure 9:
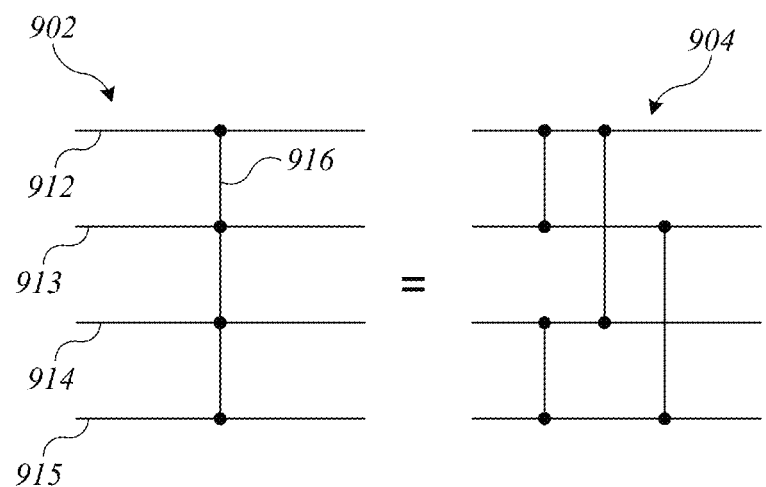
FIG. 9 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 9 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 6A, the horizontal lines 912-915 correspond to modes, and the mode coupling is indicated by a vertical line 916 with nodes (dots) to identify the modes being coupled. In this case, four modes are coupled. Circuit notation 902 is an equivalent representation to circuit diagram 904, which is a network of first-order mode couplings. More generally, where a higher-order mode coupling can be implemented as a network of first-order mode couplings, a circuit notation similar to notation 902 (with an appropriate number of modes) may be used.

Figure 10:
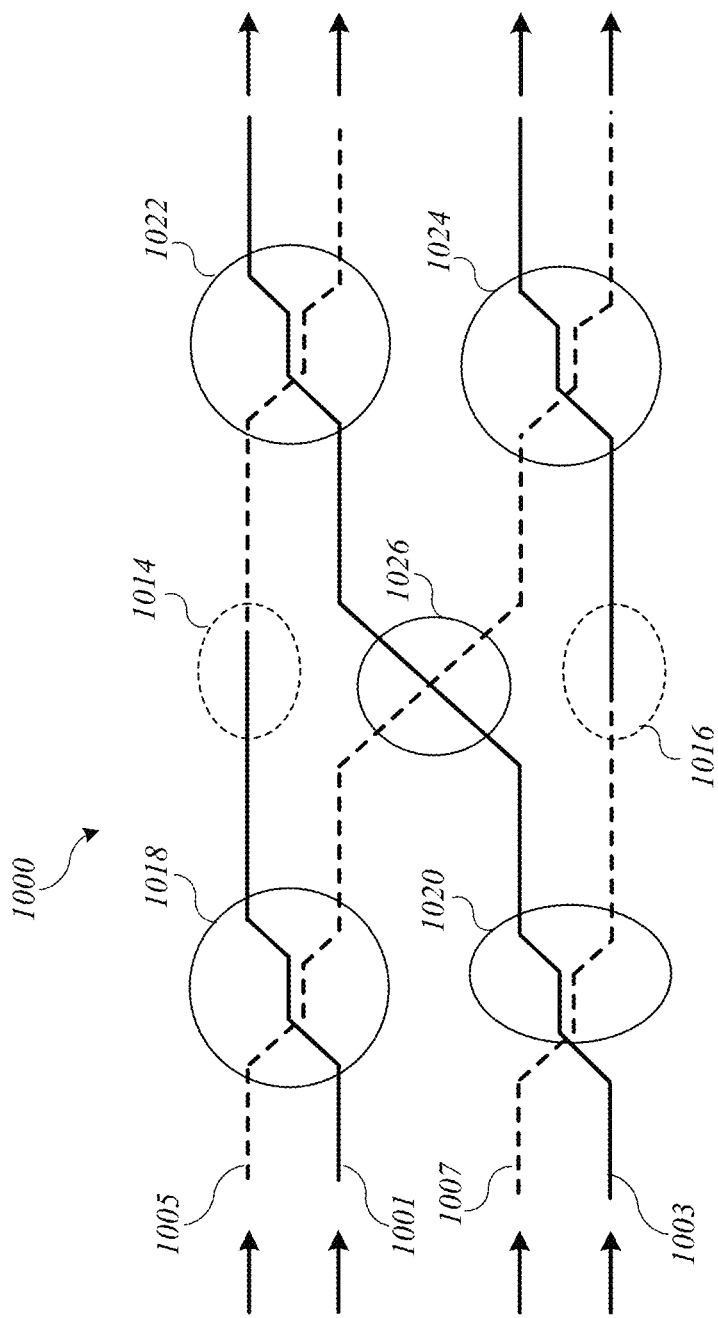
FIG. 10 illustrates an example optical device that can implement the four-mode mode-spreading transform shown schematically in FIG. 9 in accordance with some embodiments.

FIG. 10 illustrates an example optical device 1000 that can implement the four-mode mode-spreading transform shown schematically in FIG. 9 in accordance with some embodiments. Optical device 1000 includes a first set of optical waveguides 1001, 1003 formed in a first layer of material (represented by solid lines in FIG. 10) and a second set of optical waveguides 1005, 1007 formed in a second layer of material that is distinct and separate from the first layer of material (represented by dashed lines in FIG. 10). The second layer of material and the first layer of material are located at different heights on a substrate. One of ordinary skill will appreciate that an interferometer such as that shown in FIG. 10 could be implemented in a single layer if appropriate low loss waveguide crossing were employed.

At least one optical waveguide 1001, 1003 of the first set of optical waveguides is coupled with an optical waveguide 1005, 1007 of the second set of optical waveguides with any type of suitable optical coupler, e.g., the directional couplers described herein (e.g., the optical couplers shown in FIGS. 6B, 7A, 7B). For example, the optical device shown in FIG. 10 includes four optical couplers 1018, 1020, 1022, and 1024. Each optical coupler can have a coupling region in which two waveguides propagate in parallel. Although the two waveguides are illustrated in FIG. 10 as being offset from each other in the coupling region, the two waveguides may be positioned directly above and below each other in the coupling region without offset. In some embodiments, one or more of the optical couplers 1018, 1020, 1022, and 1024 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 10 can include two inter-layer optical couplers 1014 and 1016.

Optical coupler 1014 allows transfer of light propagating in a waveguide on the first layer of material to a waveguide on the second layer of material, and optical coupler 1016 allows transfer of light propagating in a waveguide on the second layer of material to a waveguide on the first layer of material. The optical couplers 1014 and 1016 allow optical waveguides located in at least two different layers to be used in a multi-channel optical coupler, which, in turn, enables a compact multi-channel optical coupler.

Furthermore, the optical device shown in FIG. 10 includes a non-coupling waveguide crossing region 1026. In some implementations, the two waveguides (1003 and 1005 in this example) cross each other without having a parallel coupling region present at the crossing in the non-coupling waveguide crossing region 1026 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

3. GMZI Implementations

In some embodiments, fast and low-loss optical switch networks can enable scalable quantum information processing using photonic qubits. For example, such networks can be employed within a linear-optical quantum computing (LOQC) system, since many such systems relies on non-deterministic processes of single-photon generation, entanglement generation and fusion measurements, and they also have important applications for quantum communications, such as enabling all-photonic quantum repeaters. However, the present disclosure is not limited to any particular use-case.

Advantageously, one or more embodiments disclosed herein provide for low loss, fast, and minimally-decohering photonic switch networks. Some embodiments provide for switch networks having a minimization of depth and count and are particularly suited for implementations that include active phase shifters, which are historically the largest contributors to the size and amount of noise in switch networks. Examples of switch networks will now be described. Such networks can be used, for instance, in any of the embodiments described above.

Components that can be used in photonic platforms include waveguides, directional couplers, passive and active (fast) phase shifters, crossings, single-photon detectors and heralded single-photon sources (HSPSs). Switch networks can be categorized according to their primary function as follows. N-to-1 (M) muxes (also referred to as N×1 muxes) map one (or multiple M) inputs to designated output ports. The inputs are commonly assumed to be probabilistic and of the same type, although more complicated assumptions apply in some problems. For example, a N-to-4 photon mux extracts groups of four photons from N HSPSs. Sometimes it is necessary to carefully distinguish the number of output (input) ports from the number of principal target outputs (inputs). Most commonly, the excess ports must be populated with the vacuum state, and the switch network is required to access specific distributions ("patterns") of the outputs (inputs) across the ports. We refer to switch networks as permutation networks when their primary purpose is to rearrange (subsets of) inputs, where the inputs should generally be regarded as inequivalent. Furthermore, switch networks are also classified on the basis of the photonic degree of freedom distinguishing their inputs. Schemes based on space and time are the most common, but the use of frequency, orbital angular momentum, and combinations of multiple degrees of freedom has also been proposed.

Figure 11A:
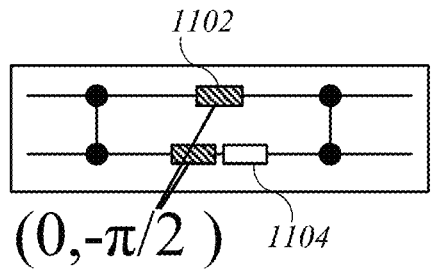
FIGS. 11A and 11B show building blocks of composite switch networks that can be used in some embodiments.
Figure 11B:
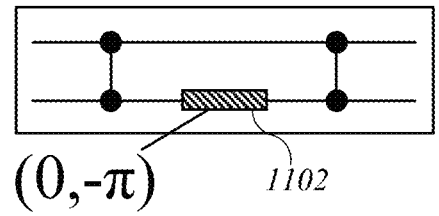

In some embodiments, Mach-Zehnder Interferometers (MZIs) may be used which are networks that implement identity or swap operations on two inputs. Two possible realizations of this type of circuit are shown in FIGS. 11A and 111B. FIGS. 11A and 11B show building blocks of composite switch networks. FIGS. 11A and 11B show 2-to-2 MZIs that implement identity or swap operations on the inputs. The circuits consist of two directional couplers with an active phase shifter 1102 (gray) on one or both arms between them. The push-pull configuration shown in FIG. 11A also has a fixed passive $-\pi/2$ phase shift 1104 (white) on one arm and selects between the two operations by setting the top or bottom active phase to $-\pi/2$. The configuration shown in FIG. 11B uses a 0 or $-\pi$ active phase to select the operation. Many switch network architectures are built by connecting multiple MZIs to form various topologies.

Figure 11C:
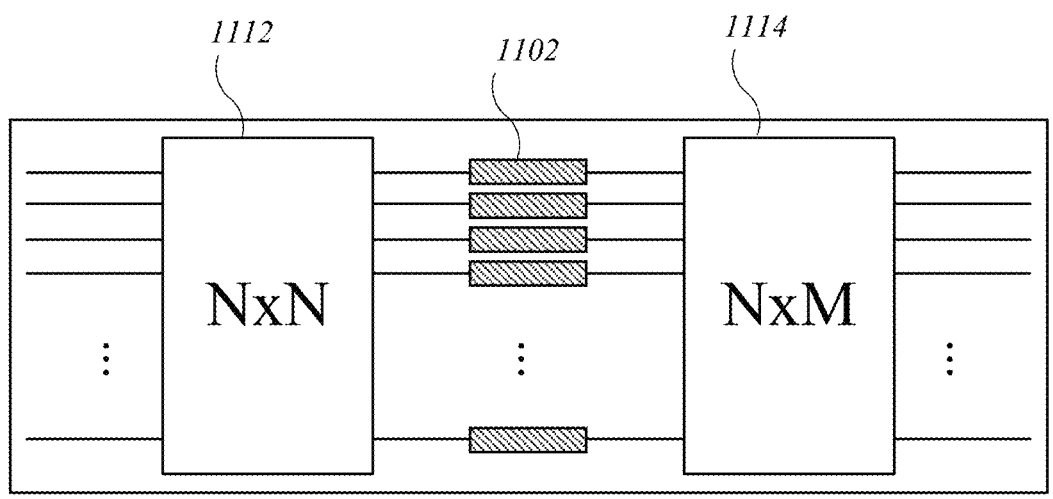
FIG. 11C shows a N-to-M GMZI that can be used in some embodiments.

The Generalized Mach-Zehnder Interferometer (GMZI) is an extension of an MZI with N>2 inputs and M≥1 outputs, shown in FIG. 11C. This configuration allows a set of permutations to be performed on the inputs, as discussed in further detail below, making this device a powerful block for the construction of composite N-to-1 and N-to-M switch networks. FIG. 11C shows a N-to-M GMZI made of two passive balanced splitter networks 1112, 1114 (white) and a layer of N active phase shifters 1102 (gray). Varying the settings of the active phases selects specific permutations of the N inputs and routes them to M>1 output ports.

There are a number of spatial mux schemes that select one of multiple inputs from distinct locations in space. For example, a N-to-1 GMZI can be used as a mux, since it allows routing of any input to a single output port. The advantages of this scheme are its low constant active phase shifter depth (1) and count (N). However, the total propagation distance and the number of waveguide crossings increase rapidly with N. This downside of the monolithic GMZI structure is obviated by constructing composite switch networks of 2-to-1 MZIs, at the cost of increasing the component depth and count. Two examples of N-to-1 schemes of this kind include the "log-tree" and "chain", both of which can be built with no crossings.

Figure 12A:
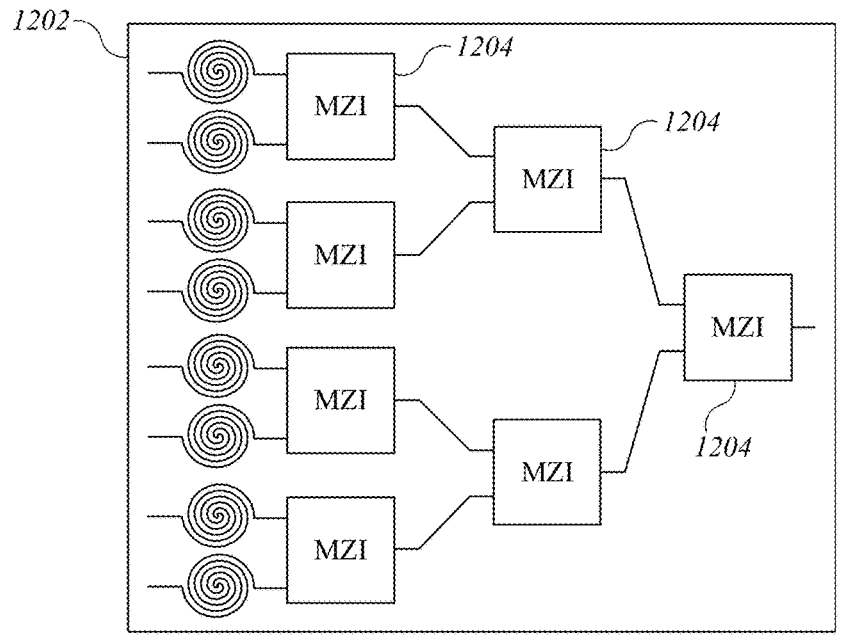
FIGS. 12A and 12B show spatial N-to-1 muxes, with inputs at N spatially-distinct locations (ports), that can be used in some embodiments.
Figure 12B:
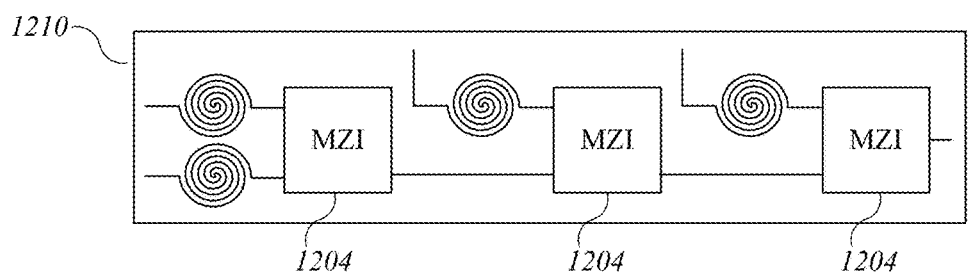

FIGS. 12A and 12B show spatial N-to-1 muxes, with inputs at N spatially-distinct locations (ports). FIG. 12A shows a log-tree mux 1202 (N=8 example). 2-to-1 MZIs 1204 form a tree structure with $2(2^{\lceil log_2(N) \rceil}-1)$ active phase shifters arranged in $\lceil log_2(N) \rceil$ layers. FIG. 12B shows a chain mux 1210 (N=4 example). (N−1) MZIs 1204 are connected through one output and input to form a line. The active phase shifter count is the same as for the log-tree, but the depth varies between 1 and (N−1).

In a "log-tree", the MZIs form a converging symmetric tree of degree 2, where the chosen input is routed from one of the leaves to the root, as shown in FIG. 12A. An asymmetric variant of this scheme, known as a "chain", includes MZIs cascaded to form a linear topology in which each block selects either the output of the previous block or the new input, as shown in FIG. 12B. The depth of the network traversed by the output depends on the chosen input, which can worsen the interference of resources from different chains, due to imbalanced losses and errors. The switching logic of this scheme presents an interesting advantage: while being very simple and entirely local to each individual MZI, it minimizes the amount of error on by selecting the input available closest to the output. Analysis of these three schemes in the context of single photon multiplexing shows that all three architectures require components with performance well beyond the state-of-the-art to achieve a multiplexing efficiency high enough for use in LOQC.

Figure 13A:
FIGS. 13A and 13B show N-to-1 temporal muxes, with inputs in N distinct time bins, that can be used in some embodiments.

In temporal multiplexing, resources can be input at the same spatial location but different times, and the aim is to produce an output in a specific time bin. This requires networks with fewer components, but the output time bins become longer. There are two main kinds of temporal schemes: designs with storage devices, such as cavities or fiber loops, and designs based on networks of delays The former simply consist of a storage device 1302 and a single 2×2 switch network 1304 used to choose whether to store or output each input, as shown in FIG. 13A. This can be thought of as the temporal version of a chain mux, and it presents the same advantage in terms of switching logic. The log-tree also has a temporal equivalent known as a "binary-division delay network". This scheme consists of a series of MZIs 1304 with delays of different lengths between them, as illustrated in FIG. 13B.

Figure 13B:
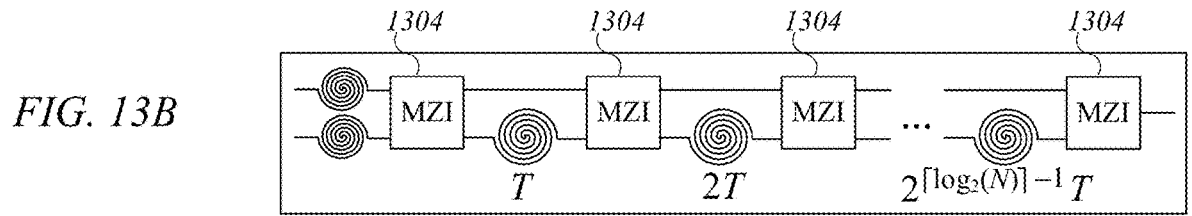

FIGS. 13A and 13B show N-to-1 temporal muxes, with inputs in N distinct time bins. FIG. 13A shows a storage loop scheme (time chain). A 2×2 MZI receives one resource per time bin T and routes it to a storage device (a delay line here) or discards it. After N time bins, the chosen input is output. The number of active phase shifters in the path of the chosen input varies between 1 and N. FIG. 13B shows a binary delay network (time log-tree). The scheme comprises a series of $\lceil \log_2(N) \rceil + 1$ MZIs with delays of lengths $2^n T$ between them, where T is the duration of a time bin at the input and $n=0, \ldots \lceil \log_2(N) \rceil - 1$. The active phase shifter depth scales as with the number of input time bins as $\lceil \log_2(N) \rceil$.

The topologies described above can be generalized by replacing each MZI with a GMZI with n inputs, as shown in FIGS. 14A-14D. This introduces a trade-off between the active phase shifter depth and count, which decreases with n, and the number of waveguide crossings and propagation distance within each block, which increases with n. In addition, this modification turns temporal schemes into hybrid networks, where multiple spatially distinct resources are input in each time bin. The trade-offs introduced by the parameter n can be exploited to optimize the structure of these schemes for different regimes of physical error rates.

Figure 14B:
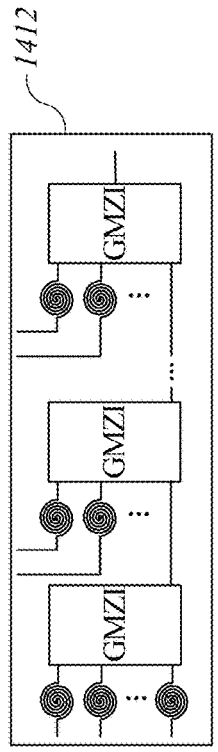
FIGS. 14A-14D show examples of generalized N-to-1 composite multiplexing networks that can be used in some embodiments.
Figure 14C:
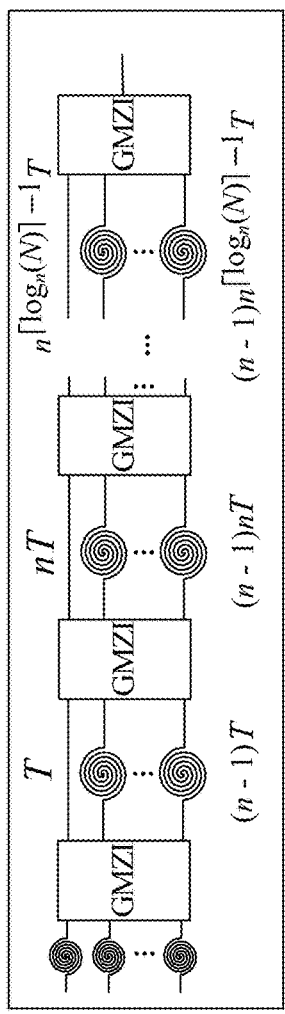
Figure 14D:
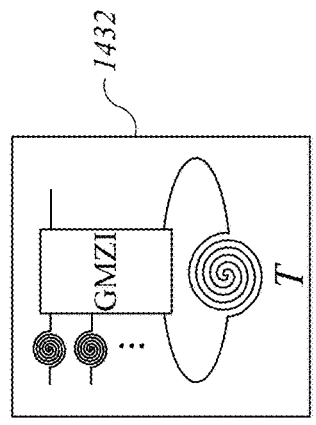
Figure 14A:
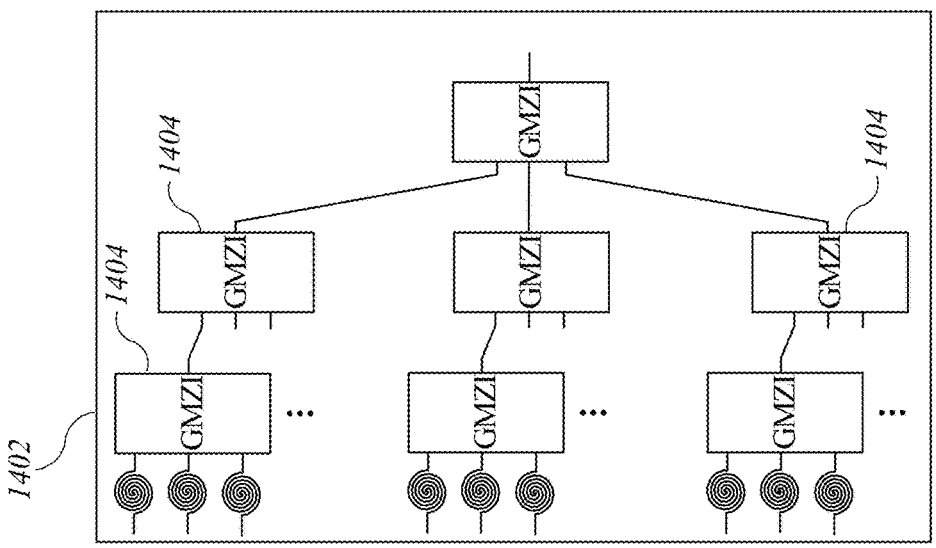

FIGS. 14A-14D show examples of generalized N-to-1 composite multiplexing networks, obtained by replacing the MZI sub-blocks with n×1 GMZIs 1404. FIG. 14A shows a generalized spatial log-tree 1402 (n=3 example with some first layer GMZIs omitted for simplicity). The degree of the tree is n and its depth is $\lceil \log_n N \rceil$. FIG. 14B shows a generalized spatial chain 1412. Each stage after the first takes n−1 new inputs, so that the depth of the network varies between 1 and $\lceil (N-1)/(n-1) \rceil$. FIG. 14C shows a generalized delay network (time log-tree) 1422. The GMZIs enclose $\lceil \log_n N \rceil$ layers of n−1 delays with lengths $n^i, \ldots (n-1)n^i$, where $i=0, \ldots, \lceil \log_n N \rceil - 1$ is the index of the layer of delays. The number of active phase shifters on a path across the scheme is $\lceil \log_n N \rceil + 1$. FIG. 14D shows a generalized storage loop scheme 1432. n−1 inputs enter the GMZI in every time bin. After $\lceil N/(n-1) \rceil$ time bins, the GMZI outputs the chosen input.

In applications such as LOQC, which rely on the interference of multiplexed resources, multiplexing is used to produce synchronized outputs. The schemes described so far achieve this by having a single predetermined output spatio-temporal bin. However, when large output probabilities are needed this leads to a large of resources, which can be understood as follows. The number of available resources for a network of size N follows a binomial distribution with average value $\bar{N}=Np$, where p is the probability of an input being populated. The probability of a network successfully producing an output is then $p_{mux}=1-(1-p)^N$. For the typical situation with large N and small p values, the binomial distribution is well approximated by a Poissonian distribution, and so $p_{mux} \cong 1 - e^{-Np}$. It follows that the average number of inputs scales as $Np=-\ln(1-p_{mux})$, and so the number of available resources that are not used grows rapidly as $p_{mux}$ approaches 1. An alternative approach that leads to major efficiency improvements is relative multiplexing. Rather than routing resources to single pre-allocated outputs, this technique uses spatial or temporal log-tree networks to synchronize selected inputs in variable space-time locations, chosen depending on the resources available at any particular instant.

N-to-M schemes in the literature are generally based on the spatial degree of freedom. The simplest of these is a GMZI with more than one output, which has the appealing feature of a single layer of N active phase shifters. However, it only gives access to N permutations, and therefore to limited combinations of inputs. Consequently, the N×M GMZI is more useful when used as a permutation network or as a building block for larger schemes. More flexible routing is achieved by using smaller networks to build composite topologies, known as "switch fabrics". However, the component depth and count and the size of the crossing networks of these schemes tend to be large, and these downsides trade against each other, making the networks impractical for use in the field of quantum applications.

Figure 15A:
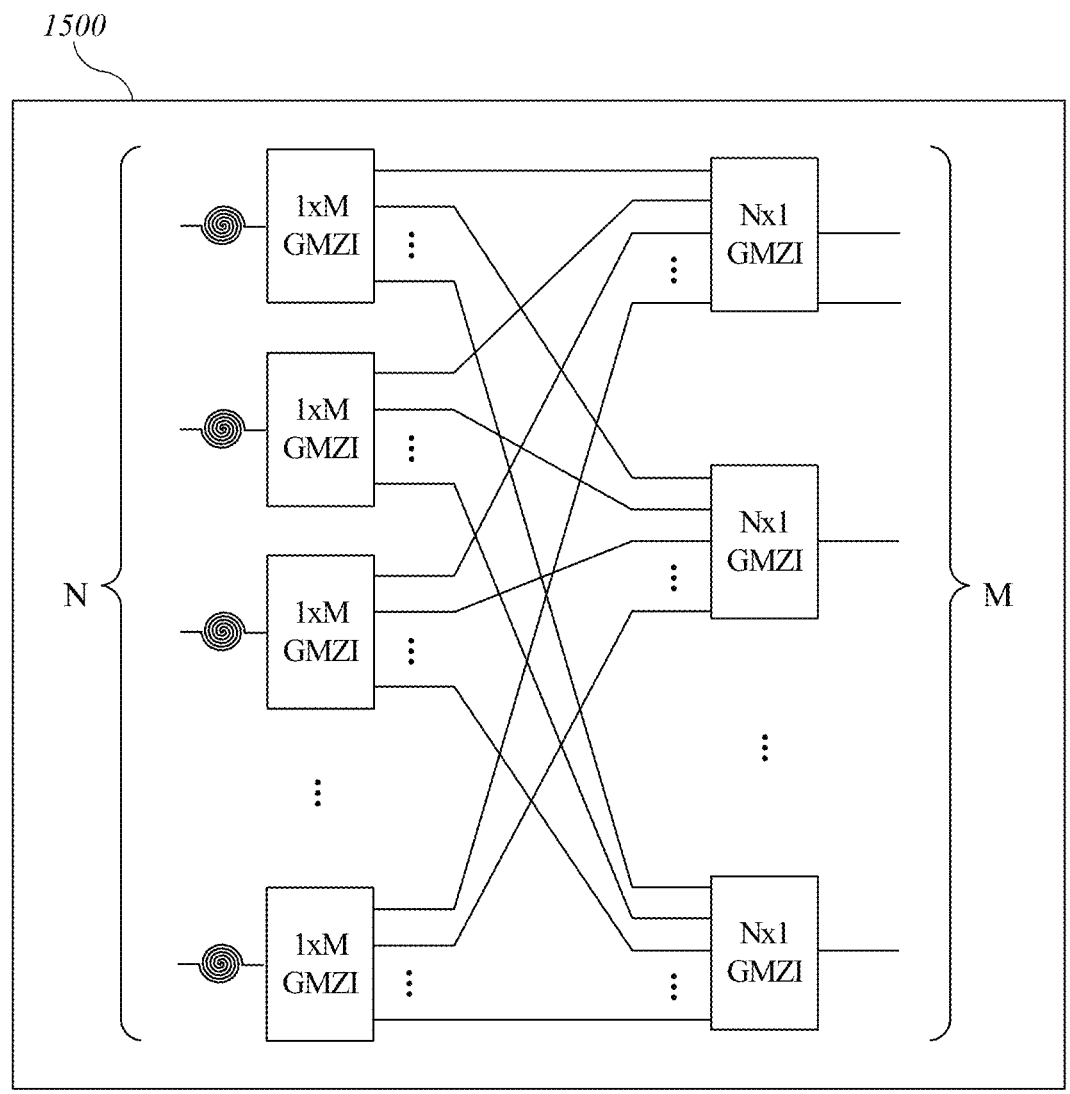
FIGS. 15A and 15B show examples of N-to-M switch networks that can be used in some embodiments.

As an example, Spanke's tree network 1500, shown in FIG. 15A, allows arbitrary rerouting of the inputs with a constant active switch depth of 2, at the cost of a large number of active phase shifters and waveguide crossings. However, the number of active phase shifters and waveguide crossings scales as O(NM). On the other hand, the scheme 1520 shown in FIG. 15B avoids large crossing networks, but has an active phase shifter count O(NM) and depth that varies between 1 and M, resulting in variable error rates on the outputs.

Figure 15B:
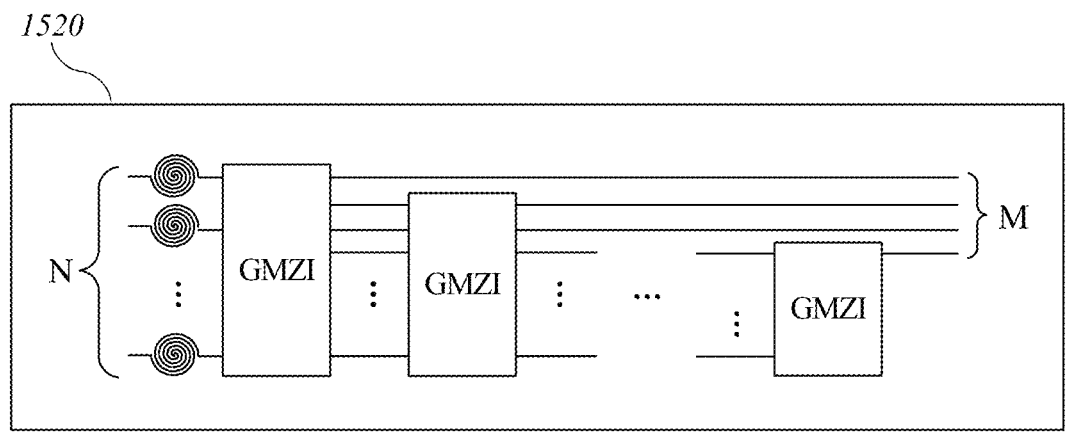

FIGS. 15A and 15B show examples of N-to-M switch networks. FIG. 15A shows a Spanke network 1500. Two layers of interconnected GMZIs allow arbitrary routing of N inputs to M outputs. The fixed active phase shifter depth of 2 makes this scheme interesting, but the scaling of the number of active phase shifters and crossings scaling as (NM) poses challenges for large sizes. FIG. 15B shows a concatenated GMZI 1520. This scheme consists of M concatenated GMZIs with progressively fewer outputs. No complex crossing networks are required between its building blocks, but the O(NM) active phase shifter count and variable depth up to M limit the maximum feasible network size.

For quantum applications, where low error rates are required, N-to-M muxes need to be simplified to reduce the number of active phase shifters, both in total and along the path to the output, as well as the complexity of the crossing networks. The routing algorithms associated with these networks also need to be simplified, to avoid the need for unfeasibly long delays for the inputs. The complexity of the logic is largely determined by its generality, so restricting the operation of the networks to specific tasks is helpful to reduce processing times. These provide guiding principles for the design of additional schemes.

A general switch network implements a set of unitary transfer matrices $U_k$, where each unitary routes light between a subset of input and output ports. If $U_k$ routes light from port t to port s, then its sth row and tth column must be zero apart from $|U_{s,t}|=1$, and similarly for other pairings of input and output ports. The aim of this section is to elucidate the sets of routing operations that are achievable using the simplest form of a many-mode switching network, which is to say one corresponding to transfer matrices $U_k = WD_k V^\dagger$, where the unitary matrices W, $V^\dagger$ describe passive interferometers, and the $D_k$ form a set of diagonal phase matrices. The phase matrices are implemented physically using a single layer of fast phase shifters acting on every mode, and for simplicity, we will write D in terms of a phase vector d, $D_{s,t}=d_s\delta_{s,t}$. The discussion below provides a comprehensive treatment of these switch networks and presents several new constructions.

An important class of switch networks is obtained by considering sets of permutation matrices $\{U_k = WD_k V^\dagger\}$. By adding the fixed passive network corresponding to e.g. $U_1^{-1}$ (so, the inverse of an arbitrary permutation from that set), we obtain a new set $\{U_k U_1^{-1}\}\{WD'_k W^\dagger\}$ of pairwise commuting permutation matrices. So it makes sense to restrict the discussion to the case where the $\{U_k\}$ are commuting. Switch networks of this type were introduced above as "Generalized Mach-Zehnder interferometers" (GMZIs). Here we need a more precise definition for GMZIs, and we will define them as switch networks having the following specific properties:

(i) $\{U_k = WD_k W^\dagger\}$ is a set of transfer matrices corresponding to commuting permutations of N modes. The entries of $D_k$ are given by roots of unity (up to an overall global phase factor $e^{i\phi_k}$ which can be chosen at will).

(ii) The GMZI switch setting $D_k$ routes light from input port 1 to output port k.

From these properties it is straightforward to prove that the GMZI must have exactly N settings, and that for any choice of input and output port, there is exactly one setting which routes light between the ports.

From a mathematical standpoint, the set of operations implemented by a GMZI on N modes forms an abelian group of order N. This fact is very helpful here as it allows us to characterize the entire family of GMZIs defined by (i), (ii) using well-known results from group theory (namely the basis theorem for finite abelian groups). In particular, for any GMZI, $\{U_k\}$ must be isomorphic to a direct sum of cyclic groups, where the order of each of the cyclic groups is a power of a prime number.

To be more concrete, we define groups of commuting permutations $\mathcal{G}([n_1, n_2, \ldots, n_r])$ generated by matrices $C^{(n_1)}\otimes I^{(n_2)}\otimes I^{(n_3)} \ldots, I^{(n_1)}\otimes C^{(n_2)}\otimes I^{(n_3)} \ldots, I^{(n_1)}\otimes I^{(n_2)}\otimes C^{(n_3)} \ldots$, where $(C^{(n)})_{i,j} = \delta_{i,(j+1) \bmod n}$ is a cyclic permutation matrix of size n, and $I^{(n_i)}$ is the $n_i \times n_i$ identity matrix, and $\otimes$ is the Kronecker product on matrices (The Kronecker product here acts at the level of linear-optical transfer matrices and should not be confused with tensor product operations on quantum state spaces), and the group operation is matrix multiplication. Then, any GMZI on N modes, satisfying properties (i), (ii) above, must implement a set of permutation operations which corresponds to one of the possibilities for $\mathcal{G}([n_1, n_2, \ldots, n_r])$ with $N=\Pi_{l=1}^{r} n_l$ (up to fixed mode permutations at the input and output).

The different types of GMZIs of fixed size can now be determined using the fact that $\mathcal{G}([n_1, n_2])$ and $\mathcal{G}([n_1 n_2])$ are isomorphic if and only if $n_1$ and $n_2$ are coprime. For example, for N=8, we can identify three fundamentally different types of GMZI:

(i) $\mathcal{G}([2,2,2])$, permutations are generated by Pauli matrices $X\otimes I^{(2)}\otimes I^{(2)}$, $I^{(2)}\otimes X\otimes I^{(2)}$, $I^{(2)}\otimes I^{(2)}\otimes X$.

(ii) $\{\mathcal{G}([4,2])\}$, permutations are generated by matrices $$C^{(4)} \otimes I^{(2)} \text{ where } C^{(4)} = \begin{pmatrix} & & & 1 \\ 1 & & & \\ & 1 & & \\ & & 1 & \end{pmatrix}, \text{ and } I^{(4)} \otimes X.$$

(iii) $\mathcal{G}([8])$, permutations are generated by matrix $$C^{(8)} = \begin{pmatrix} & & & & & & & 1 \\ 1 & & & & & & & \\ & 1 & & & & & & \\ & & 1 & & & & & \\ & & & 1 & & & & \\ & & & & 1 & & & \\ & & & & & 1 & & \\ & & & & & & 1 & \end{pmatrix}.$$

We refer to GMZIs implementing $\mathcal{G}([2,2,\ldots,2])$, i.e. permutations of the form of swaps on subsets of modes, as "Hadamard-type" GMZIs due the type of passive interferometer which is used (explained below). Similarly, we refer to GMZIs implementing $\mathcal{G}([N])$ as "discrete-Fourier-transform (DFT)-type".

The discussion above characterizes the routing power of linear-optical circuits using one-layer of fast phase shifters in the switch network. In particular, a GMZI on N modes is limited to N routing operations, which is obviously small compared to the N! possible mode rearrangement operations. However, the possibility of implementing different sets of permutation operations is exploited by some of designs for spatial and temporal muxes which are discussed herein. Strictly speaking the limitation to N operations originates in property (ii) above—i.e. the ability to route light from any input port to any output port. More general constructions using a single stage of active phase shifts can be trivially obtained by acting with separate GMZIs on subsets of modes. The resulting transfer matrices are given by the direct sum of the individual GMZIs' transfer matrices. For example, using three MZIs in parallel results in a switch network on 6 modes, allowing 8 different settings. Such a construction can implement abelian groups of permutations of maximum order, which are given in J. M. Burns and B. Goldsmith, Bull. London Math. Soc. 21, 70 (1989), with the number of operations scaling to good approximation as $\sim 3^{N/3}$.

We now turn to linear-optical circuits that can implement the GMZIs defined above. In particular, a circuit that can implement the routing operations $\mathcal{G}([n_1, n_2, \ldots, n_r])$ on $N=\Pi_{l=1}^{r} n_l$ modes must enact transfer matrices of the form, $$P_k = (C^{(n_1)})^{k_1} \otimes (C^{(n_2)})^{k_2} \otimes \ldots \otimes (C^{(n_r)})^{k_r},$$

with settings vector k where $0 \leq k_l < n_l$ with $l=1, \ldots, r$. This can be achieved using a circuit with transfer matrices $WD_k W^\dagger$ as follows:

$$W = W^{(n_1)} \otimes W^{(n_2)} \otimes \ldots \otimes W^{(n_r)}$$

$$\text{with } (W^{(n_l)})_{s,t} = \frac{e^{j2\pi st/n_l}}{\sqrt{n_l}},$$

where the $W^{(n_l)}$ are DFT matrices; the kth setting of the fast phase shifters is given by $$D_k = D_{k_1}^{(n_1)} \otimes D_{k_2}^{(n_2)} \otimes \ldots \otimes (C^{(n_r)},$$

with $(d_k^{(n)})_s = e^{-j2\pi ks/n}$ for $D_k^{(n)}$.

One route to constructing practical interferometers for W and $W^\dagger$ is to reduce them to networks of beam-splitter and phase-shifter components using generic unitary decompositions from M. Reck et al., Phys. Ref. Lett. 73, 58 (1994), or W. R. Clements et al., Optica 3, 1460 (2016). These decompositions have optical depth (number of optical elements encountered on the longest path through the interferometer) scaling as 2N−3 and N respectively. This means that the transmittance along the longest path will scale with an exponent which is proportional to the size parameter N—which presents a severe experimental limitation for scaling to large GMZI sizes.

Figure 17A:
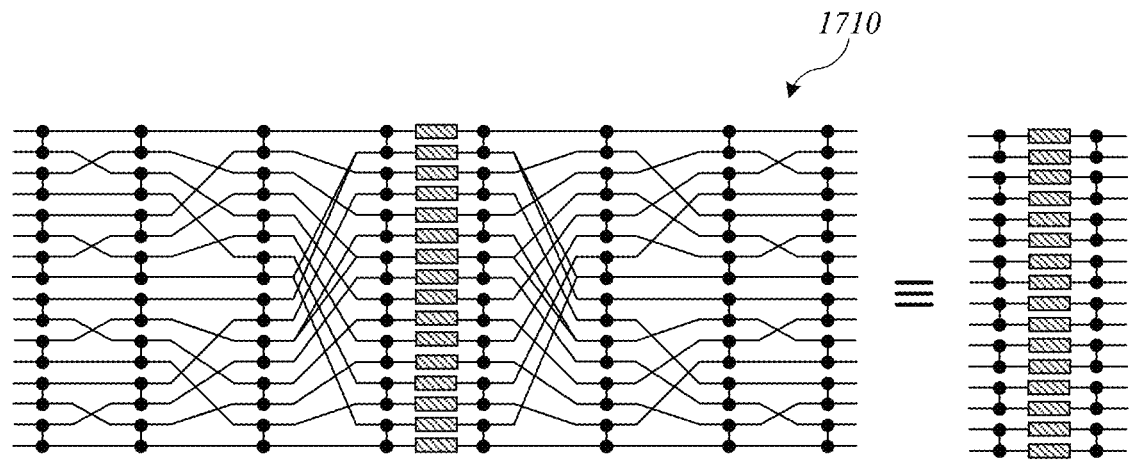
FIGS. 17A and 17B show Hadamard-type GMZI constructions that can be used in some embodiments.

GMZI networks—having a lot of special structure—allow for specific decompositions of the type given by equation 1600 shown in FIG. 16, where the matrices S, correspond to crossing networks which reorder modes within the interferometer. Since the subexpressions of the form $I^{(N/n_l)} \otimes V^{(n_l)}$ correspond to repeated blocks of modes interfering according to unitary $V^{(n_l)}$, the equation for W in FIG. 16 can be seen to describe stages of local interference separated by crossing networks. Note also that since the bracketed expressions in the decomposition commute there is some freedom in the configuration of the crossing networks, and some of them can be treated as relabelings of modes rather than physical circuit elements. FIG. 17A illustrates the construction of a Hadamard-type GMZI using the decomposition, as well as simplification which is possible when the GMZI is used as a N-to-1 mux.

Figure 17B:
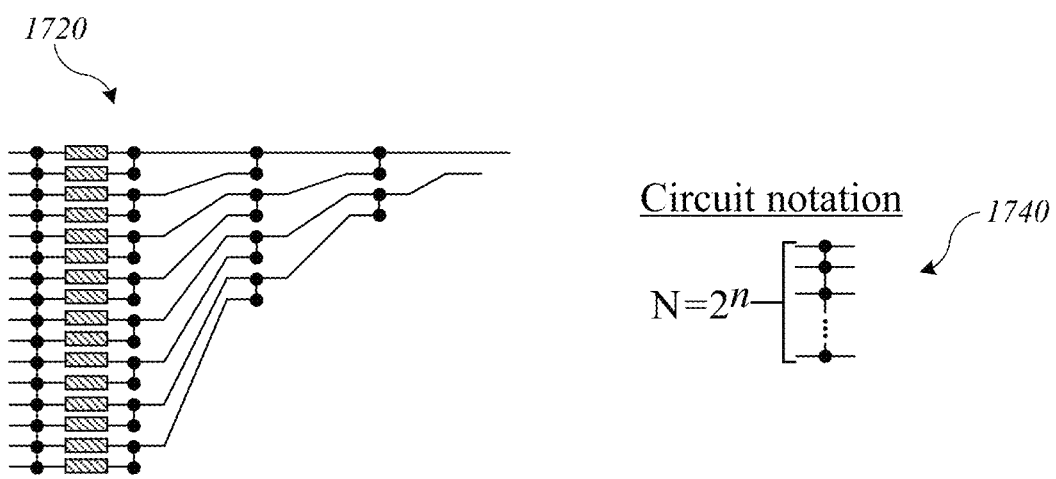

FIGS. 17A and 17B show Hadamard-type GMZI constructions: (i) in FIG. 17A, illustration of a linear-optical circuit 1710 for a GMZI on N=16 modes, for which the fast phase shifters are set to configurations of 0 and $\pi$ to select one of 16 operations from $\mathcal{G}([2,2,2,2])$; (ii) in FIG. 17B, possible simplification of the circuit 1720 when only one output port is required—as is the case when the GMZI is used as a N-to-1 mux. The passive interferometers are constructed following the decomposition of W with stages of interference using 50:50 beam-splitters or directional couplers on pairs of adjacent modes, separated by crossings networks. Note that the phases in the physical interferometer generally differ from the constructions given in the main text, and this implies minor modifications for the transfer matrices and phase-shifter settings. An equivalent circuit notation 1740 is shown in FIG. 17B.

For more general GMZI types, we note that the unitary matrices $V^{(n_l)}$ can be decomposed into elementary beam-splitter and phase-shifter operations using the generic decomposition methods mentioned above. Alternatively, since the $V^{(n_l)}$ are assumed to be discrete Fourier transforms, they can be recursively decomposed into smaller discrete Fourier transforms acting on sets of local modes $I^{n_l/(n_l')} \otimes V^{(n_l')}$, $I^{n_l/(n_l')} \otimes V^{(n_l')}$ (for any sizes satisfying $n_l = n_l' \times n_l''$) together with crossings networks and additional phase shifts.

One more subtle feature of the GMZI constructions that was remarked on above is that the matrices $D_k$ for the GMZIs are determined up to a setting-dependent global phase factor $e^{i\Phi_k}$. In principle these global phases can be freely set over a range $[0, 2\pi)$ (provided the active phase shifters themselves are configured with sufficient phase range). For an application such as single-photon multiplexing, the global phase factors have no role in the operation of the switch network. However, they can be useful if the switch network is applied to only some part of the input states (e.g. single rails from dual-rail qubits) or if it is incorporated in larger interferometers. In these cases, additional functionality can be absorbed into the operation of the switch network without adding extra layers of switching.

This idea is very useful for LOQC, where it is often desirable to multiplex some circuit which generates entangled states, whilst also applying internal adaptive corrections to its output. An example of this occurs when multiplexing Bell states from a standard BSG circuit. This circuit produces a Bell state across four modes with probability 3/16, but the Bell states do not conform to dual-rail qubit encoding (i.e. with qubits allocated to fixed pairs of modes) in a third of cases. Although this problem can be addressed using an additional MZI at the mux output to perform an optional mode-swap operation, a more elegant solution is presented in FIGS. 18A and 18B.

Figure 18A:
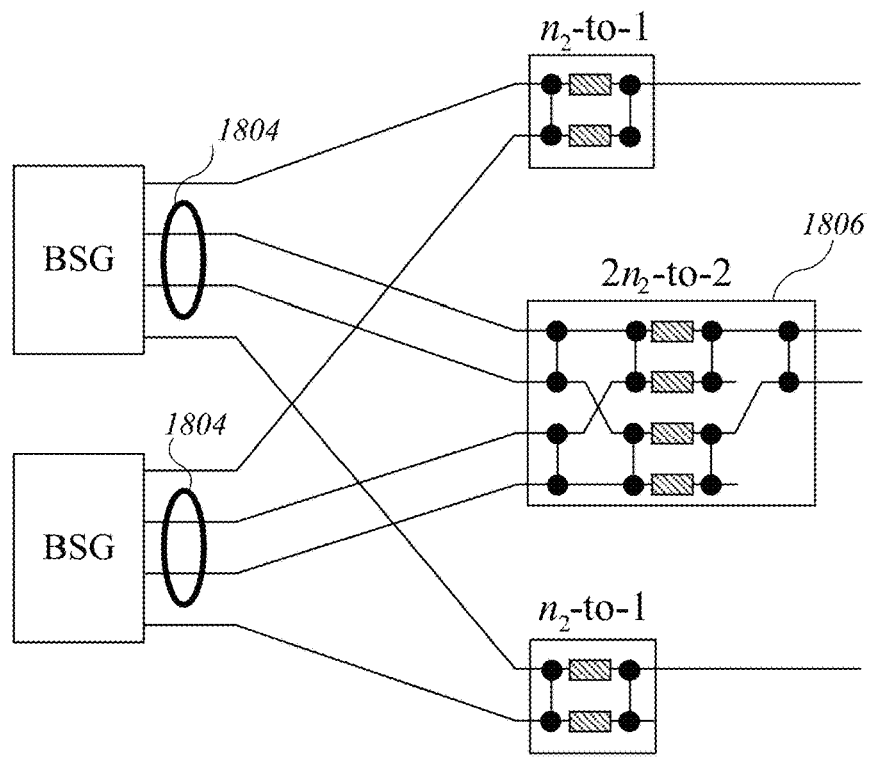
FIGS. 18A and 18B show examples of larger GMZI that can be used in some embodiments.
Figure 18B:
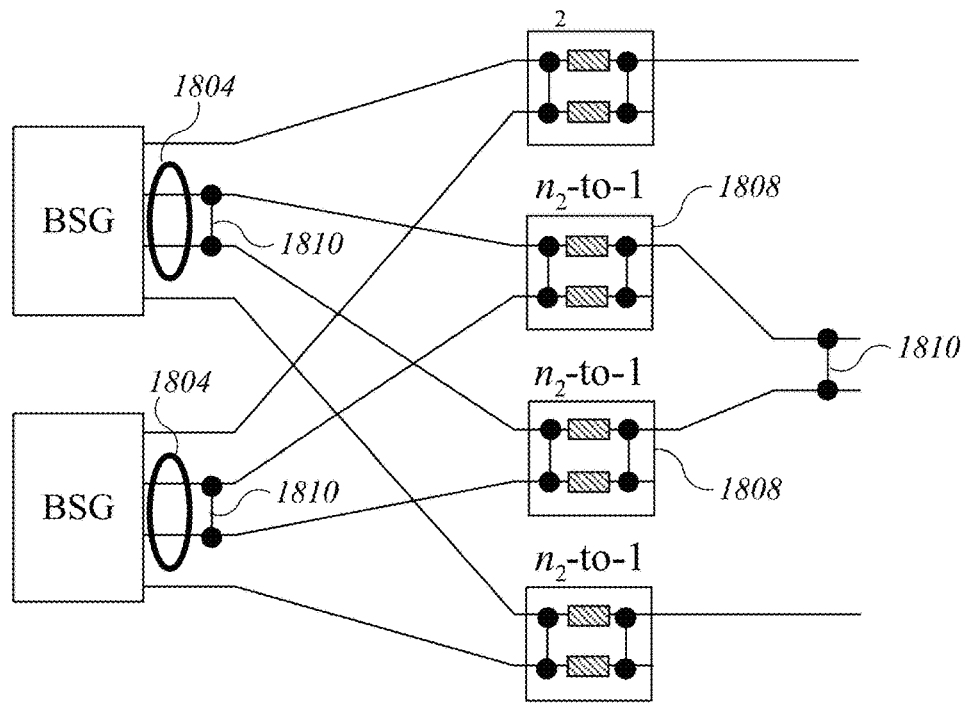

FIGS. 18A and 18B show examples of larger GMZI to implement adaptive swaps of rails while multiplexing Bell states generated with $n_2$ standard BSGs. FIG. 18A shows sending the two rails that might need to be swapped (circled at 1804) through a single GMZI 1806 of size $N=n_1 n_2$ ($n_1=n_2=2$ in this diagram) allows multiplexing and permutation operations to be combined while avoiding the need for an additional switching stage. FIG. 18B shows that the modular structure of the GMZI 1806 can be exploited to apply portions of the circuit at different locations and to optimize the physical implementation. In this example, the network which incorporates the swap operation can be decomposed into two 2-to-1 GMZIs 1808 with extra directional couplers 1810 applied at the output of the BSGs and between the two output rails.

In this approach, a mux on $n_2$ copies of the BSG implements multiplexing and swap operations, using a size $N=n_1 n_2$ GMZI on $n_1=2$ inner rails from each BSG, and regular $n_2$-to-1 multiplexing for the outer rails. The ability to permute the rails increases the success probability for generating a dual-rail encoded Bell state from 1/8 to 3/16, and thereby decreases the amount of multiplexing needed to reach any particular target output probability by a factor of ~1.55.

More generally, the transfer matrices associated with a GMZI that implements the routing operations $\mathcal{G}([n_1, n_2])$ are $$P_{(k_1, k_2)} = (C^{(n_1)})^{k_1} \otimes (C^{(n_2)})^{k_2} = (C^{(n_1)} \otimes I^{(n_2)})^{k_1} (I^{(n_1)} \otimes C^{(n_2)})^{k_2}.$$

This can be interpreted as $n_1$ separate copies of $n_2$-to-1 GMZIs (second term) with an additional set of permutations of the $n_1$ outputs also available (first term). So, permutations of $n_1$ rails can be implemented while multiplexing each one $n_2$ times by sending all $N=n_1 n_2$ inputs through a single larger GMZI rather than smaller separate ones. The key advantage of this method is that the depth and total number of active phase shifters do not change (1 and N respectively).

Using a larger GMZI comes at the cost of increasing the optical depth of the circuit, particularly in terms of waveguide crossings. As seen from the expression of W above, the passive interferometers in a GMZI can be decomposed into smaller networks connected by layers of crossings. This modular structure can be exploited to distribute parts of the circuit across different locations and avoid large on-chip crossing networks. In the BSG example, the implementation shown in FIG. 18B highlights how the first layer of crossings can be realized in a different way, e.g. using long distance phase-stable optical routing, to mitigate the impact of the largest crossing network in the interferometer.

The discussion so far presented a large family of GMZIs and explained their key properties, taking an approach focused on achievable sets of permutations which is different to earlier works. As well as N-to-1 muxing (potentially with extra functionality as explained above, these GMZIs have assorted applications as building blocks for spatial and temporal muxes. Alternative constructions of GMZIs are also possible, and it is valuable to explore them with a view to minimizing practical requirements on fast phase shifters. However, it is not feasible to exhaust all possible GMZI designs, as some properties for Hadamard matrices are not known. Instead we will highlight some specific new constructions with useful properties.

One observation is that phase swing requirements (where the swing is defined per phase shifter as the difference between the maximum and minimum phase shifts across all GMZI settings) can sometimes be reduced by introducing fixed phase-shift offsets. For some of the constructions above, the phase shifter settings correspond to complete sets of roots of unity, and the phase swing is $\pi$ for Hadamard interferometers and $>\pi$ for the other GMZI types. Table 1 shows examples of reduced swing for GMZI sizes $N=2,3,4$ including examples of GMZIs with reduced phase swing using fixed phase-shift offsets. It is assumed that all the fast phase shifter components are identical and access the same range of phase shifts (which is minimized). Note that the use of offsets necessitates modification of the GMZI transfer matrices by additional phase factors corresponding to setting-dependent "global" phases at the output.

TABLE 1

| GMZI type | Phase offsets | Comment |
|---|---|---|
| Hadamard $N = 2$ | $(-3\pi/2, 0)$ | Swing reduced from $\pi$ to $\pi/2$, coinciding with MZI variant in FIG. 11A. |
| DFT $N = 3$ | $(-4\pi/3, 0, 0)$ | Swing reduced from $4\pi/3$ to $2\pi/3$. |
| Hadamard $N = 4$ | $(-\pi, 0, 0, 0)$ | Swing unchanged at $\pi$, but for each setting only one phase shifter is set to $\pi$ and the others to 0. |

To find some more subtle constructions, we can consider general constraints on GMZIs implementing transfer matrices $U_k = WD_k V^\dagger$ on N modes, which are required to act minimally as N-to-1 muxes. It is straightforward to prove a lemma stating that (a), V in this case must be proportional to a complex Hadamard matrix (i.e. V must satisfy $|V_{s,t}|=1/\sqrt{N}$ as well as being unitary), and (b) the phase vectors $d_k$ must be orthogonal. A simple consequence of this result is that it is never possible to construct any GMZI for which the phase-shifter swing is less than $\pi/2$ (since it is never possible to achieve 0 for the real part of $(d_k, d_{k'})$). Similarly, when the phase-shifter values are restricted to $\{0, \pi/2\}$ it is not possible to find more than 2 orthogonal vectors $d_k$ for any even value of N (and never more than 1 for odd values of N), which is to say that it is not possible to do better than a 2-to-1 mux.

As another application of this lemma, one can look for sets of orthonormal phase vectors $\{d_k\}$ and construct a GMZI which uses these as phase settings for a N-to-1 mux, by choosing V to have row vectors $v_k = d_k$, and any unitary W with first row vector $w_1 = (1,1,\ldots,1)/\sqrt{N}$. An interesting and non-trivial example of such a set of phase vectors is given in Table 2. More specifically the able below shows examples of six orthogonal phase vectors with a subset $d_1, \ldots, d_4$ having a reduced phase swing of $2\pi/3$ (compared to $4\pi/3$ for the entire set). A N=6 GMZI constructed using these settings can implement a 4-to-1 mux which has phase swing of only $2\pi/3$ (by restricting to the first four phase-shifter settings). Furthermore, it is easily seen that this example is not related to the constructions above since the only possibility would be the GMZI implementing $\mathcal{G}([6]) \cong \mathcal{G}([3,2])$, for which individual phase settings range on six values (compared to three in Table 2).

TABLE 2

Settings for a $N = 6$ GMZI acting as a 6-to-1 mux $d_1 = (1, 1, 1, e^{-2i\pi/3}, e^{-2i\pi/3}, e^{-2i\pi/3})/\sqrt{6}$
$d_2 = (1, e^{-2i\pi/3}, e^{-2i\pi/3}, 1, e^{-2i\pi/3}, 1)/\sqrt{6}$
$d_3 = (e^{-2i\pi/3}, 1, e^{-2i\pi/3}, e^{-2i\pi/3}, 1, 1)/\sqrt{6}$
$d_4 = (e^{-2i\pi/3}, e^{-2i\pi/3}, 1, 1, 1, e^{-2i\pi/3})/\sqrt{6}$
$d_5 = (1, e^{-2i\pi/3}, e^{-4i\pi/3}, e^{-2i\pi/3}, 1, e^{-4i\pi/3})/\sqrt{6}$
$d_6 = (e^{-2i\pi/3}, 1, e^{-4i\pi/3}, 1, e^{-2i\pi/3}, e^{-4i\pi/3})/\sqrt{6}$ Finally, we turn to a new way of using GMZIs when phase settings are modified from those connecting single input and output ports. Taking Hadamard-type GMZIs with transfer matrices $U_k = WD_k W^\dagger$ on N modes, consider first when the phase vector $d_{k'}$ for $D_{k'}$ is modified so that $-\pi$ phases are set to a (common) value $-\phi$, while the 0 phases are unchanged. In this case $U_{k'}$ is modified to $$\tilde{U}_{k'}(\phi) = e^{-i\phi/2}\left[\cos\left(\frac{\phi}{2}\right)I^{(N)} + i\sin\left(\frac{\phi}{2}\right)U_{k'}\right].$$

This unitary maps a single photon incident at one input port to a superposition across the mode at the input and the output under the permutation $U_k$, with weighting controlled by the value of $\phi$. Further modification of the phase settings can achieve mappings from one input to arbitrary pairs of output ports—suppose it is desired to map from input port $p_1$ to output ports $q_1$ and $q_2$, then this can be implemented by finding the (unique) settings $k_1$, $k_2$ with $U = WD_{k_{1(2)}}W^\dagger$: $p \mapsto q_{1(2)}$, and choosing phase vector $$\tilde{d} = e^{-i\phi/2}\left[\cos\left(\frac{\phi}{2}\right)d_k + i\sin\left(\frac{\phi}{2}\right)d_{k'}\right].$$

The transfer matrix for the GMZI is then $$\tilde{U}(\phi) = e^{-\frac{i\phi}{2}}\left[\cos\left(\frac{\phi}{2}\right)U_k + i\sin\left(\frac{\phi}{2}\right)U_{k'}\right],$$

where the individual phase settings are taken from the set $\{0, -\phi, -\pi, -\pi, -\phi\}$. Note that a second input port $p_2$ is also mapped to the pair $q_1$ and $q_2$, where $U_k U_{k'}: p_1 \mapsto p_2$. We call a GMZI used according to the equation above for $\tilde{U}(\phi)$ a switchable pairwise coupler and it can be useful in spatial and temporal muxes (with the proviso that paired ports receive the vacuum state to avoid contamination of the intended input).

4. Additional Embodiments

While the invention has been described with reference to specific embodiments, those skilled in the art will appreciate that variations and modifications are possible. For instance, the number of stages in an MZL-based phase shifter can be varied as desired, and different combinations of phase shifts can be applied. Phase shifters of the kind described herein can be used in a Hadamard-type GMZI (as described above) or in other GMZI circuits or other circuits.

Further, embodiments described above include references to specific materials and structures (e.g., optical fibers), but other materials and structures capable of producing, propagating, and operating on photons can be substituted.

Although not explicitly shown in the figures, it should be understood that active switching elements can be operated under control of classical control logic and/or classical decision logic circuits. Such circuits can be implemented on-chip with the waveguides, beam splitters, detectors and/or and other photonic circuit components or off-chip as desired. Any of the classical logic circuits described herein can be implemented using a microprocessor, microcontroller, field programmable gate array (FPGA), application-specific integrated circuit (ASIC) or any other digital logic circuitry. In some embodiments, some or all of the classical logic circuits can be implemented in a classical computer system.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added. The terms "upstream" and "downstream" are used herein in reference to the direction of photon propagation along an optical path such as an optical fiber or other waveguide and are not intended to imply any particular physical arrangement of waveguides.

A recitation of "a", "an" or "the" is intended to mean "one or more" unless specifically indicated to the contrary. Reference to "one" of a particular component, feature, or other element is not intended to preclude additional co-existing instances of that component, feature, or other element, unless specifically indicated to the contrary. The use of "or" is intended to mean an "inclusive or," and not an "exclusive or" unless specifically indicated to the contrary.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. A circuit comprising:
    a first Mach Zehnder lattice having a first waveguide defining a first input path and first output path, a second waveguide defining a second input path and a second output path, the first Mach Zehnder lattice including a plurality of first active phase shifters disposed along the first waveguide and a plurality of directional coupler regions disposed along both waveguides between the first active phase shifters;
    a second Mach Zehnder lattice having a first waveguide defining a first input path and first output path, a second waveguide defining a second input path and a second output path, the second Mach Zehnder lattice including a plurality of second active phase shifters disposed along the second waveguide and a plurality of directional coupler regions disposed along both waveguides between the second active phase shifters;
    a first passive phase shifter coupled between the first output path of the first Mach Zehnder lattice and the first input path of the second Mach Zehnder lattice, the first passive phase shifter implementing a first phase shift; and
    a second passive phase shifter coupled between the second output path of the first Mach Zehnder lattice and the second input path of the second Mach Zehnder lattice, the second passive phase shifter implementing a second phase shift that differs from the first phase shift by $\pi$ radians.

2. The circuit of claim 1 wherein the plurality of first active phase shifters includes a number (S) of active phase shifters and the plurality of second active phase shifters also includes the number S of active phase shifters.

3. The circuit of claim 1 wherein:
    the first Mach Zehnder lattice further includes a plurality of first dummy phase shifters disposed along the second waveguide at locations corresponding to the first active phase shifters; and
    the second Mach Zehnder lattice further includes a plurality of second dummy phase shifters disposed along the first waveguide at locations corresponding to the second active phase shifters.

4. The circuit of claim 1 wherein each directional coupler region in the first Mach Zehnder lattice and each directional coupler region in the second Mach Zehnder lattice has a transmissivity equal to a transmissivity of each other directional coupler region in the first Mach Zehnder lattice and each directional coupler region in the second Mach Zehnder lattice.

5. The circuit of claim 1 wherein different directional coupler regions in the first Mach Zehnder lattice have different transmissivities.

6. The circuit of claim 5 wherein different directional coupler regions in the second Mach Zehnder lattice have different transmissivities.

7. The circuit of claim 1 wherein:

the first waveguide of the first Mach Zehnder lattice has an input port coupled to vacuum;

the second waveguide of the first Mach Zehnder lattice has an input port coupled to an upstream optical component capable of providing photons;

the first waveguide of the second Mach Zehnder lattice has an output port coupled to a downstream optical component capable of receiving photons; and the second waveguide of the second Mach Zehnder lattice has an output port coupled to vacuum.

8. The circuit of claim 1 further comprising:

control logic coupled to the first active phase shifters and the second active phase shifters and configured to generate a first control signal to set a third phase shift for the first active phase shifters and a second control signal to set a fourth phase shift for the second active phase shifters, wherein the third phase shift and the fourth phase shift differ by $\pi$ radians.

9. A circuit comprising:

a first Hadamard-type passive interferometer having a plurality of input paths and a plurality of output paths;

a second Hadamard-type passive interferometer having a plurality of input paths and a plurality of output paths; and a plurality of phase shifter circuits, each phase shifter circuit coupled between one of the output paths of the first Hadamard-type passive interferometer and one of the input paths of the second Hadamard-type passive interferometer, wherein each phase shifter circuit includes:

a first Mach Zehnder lattice having a first waveguide defining a first input path and first output path, a second waveguide defining a second input path and a second output path, the first Mach Zehnder lattice including a plurality of first active phase shifters disposed along the first waveguide and a plurality of directional coupler regions disposed along both waveguides between the first active phase shifters;

a second Mach Zehnder lattice having a first waveguide defining a first input path and first output path, a second waveguide defining a second input path and a second output path, the second Mach Zehnder lattice including a plurality of second active phase shifters disposed along the second waveguide and a plurality of directional coupler regions disposed along both waveguides between the second active phase shifters;

a first passive phase shifter coupled between the first output path of the first Mach Zehnder lattice and the first input path of the second Mach Zehnder lattice, the first passive phase shifter implementing a first phase shift; and a second passive phase shifter coupled between the second output path of the first Mach Zehnder lattice and the second input path of the second Mach Zehnder lattice, the second passive phase shifter implementing a second phase shift different from the first phase shift.

10. The circuit of claim 9 wherein, in each phase shifter circuit:

the first waveguide of the first Mach Zehnder lattice has an input port coupled to vacuum;

the second waveguide of the first Mach Zehnder lattice has an input port coupled to an output port of the first Hadamard-type passive interferometer;

the first waveguide of the second Mach Zehnder lattice has an output port coupled to an input port of the second Hadamard-type passive interferometer; and the second waveguide of the second Mach Zehnder lattice has an output port coupled to vacuum.

11. The circuit of claim 9 wherein, in each phase shifter circuit, the first phase shift and the second phase shift differ by $\pi$ radians.

12. The circuit of claim 9 wherein, in each phase shifter circuit, the plurality of first active phase shifters includes a number (S) of active phase shifters and the plurality of second active phase shifters also includes the number S of active phase shifters.

13. The circuit of claim 9 wherein, in each phase shifter circuit:

the first Mach Zehnder lattice further includes a plurality of first dummy phase shifters disposed along the second waveguide at locations corresponding to the first active phase shifters; and the second Mach Zehnder lattice further includes a plurality of second dummy phase shifters disposed along the first waveguide at locations corresponding to the second active phase shifters.

14. The circuit of claim 9 wherein, in each phase shifter circuit, each directional coupler region in the first Mach Zehnder lattice and each directional coupler region in the second Mach Zehnder lattice has a transmissivity equal to a transmissivity of each other directional coupler region in the first Mach Zehnder lattice and each directional coupler region in the second Mach Zehnder lattice.

15. The circuit of claim 9 wherein, in each phase shifter circuit, different directional coupler regions in the first Mach Zehnder lattice have different transmissivities.

16. The circuit of claim 9 wherein, in each phase shifter circuit, different directional coupler regions in the second Mach Zehnder lattice have different transmissivities.

17. The circuit of claim 9 further comprising:

control logic coupled to the first active phase shifters and the second active phase shifters in each phase shifter circuit and configured to generate a first control signal to set a third phase shift for the first active phase shifters and a second control signal to set a fourth phase shift for the second active phase shifters, wherein the third phase shift and the fourth phase shift differ by $\pi$ radians.

* * * * *